US012309833B2

(12) United States Patent
Bagheri et al.

(10) Patent No.: US 12,309,833 B2
(45) Date of Patent: May 20, 2025

(54) COMMUNICATION OPERATIONS IN A SHARED SPECTRUM

(71) Applicant: Lenovo (Singapore) Pte. Ltd., Singapore (SG)

(72) Inventors: Hossein Bagheri, Urbana, IL (US); Joachim Löhr, Wiesbaden (DE); Alexander Golitschek Edler von Elbwart, Darmstadt (DE); Hyejung Jung, Northbrook, IL (US); Ankit Bhamri, Bad Nauheim (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 688 days.

(21) Appl. No.: 17/520,539

(22) Filed: Nov. 5, 2021

(65) Prior Publication Data
US 2023/0141989 A1    May 11, 2023

(51) Int. Cl.
*H04W 74/0808* (2024.01)
*H04L 1/1812* (2023.01)
(Continued)

(52) U.S. Cl.
CPC ....... *H04W 74/0808* (2013.01); *H04L 1/1812* (2013.01); *H04W 16/14* (2013.01); *H04W 72/23* (2023.01)

(58) Field of Classification Search
CPC . H04W 74/0808; H04W 72/23; H04W 16/14; H04L 1/1812
(Continued)

(56) References Cited

U.S. PATENT DOCUMENTS

| 2016/0029245 A1* | 1/2016 | Hong ................ H04W 28/0252 370/329 |
| 2016/0345344 A1* | 11/2016 | Larsson ................ H04W 72/23 |
| 2019/0335500 A1* | 10/2019 | Zhang ............... H04W 74/0808 |

OTHER PUBLICATIONS

Asustek , "Discussion on aspects related to duplex operation", 3GPP TSG RAN WG1 #106bis-e, R1-2110108, e-Meeting [retrieved Feb. 27, 2023]. Retrieved from the Internet <https://www.3gpp.org/ftp/TSG_RAN/WG1_RL1/TSGR1_106b-e/Docs/?sortby=daterev>, Oct. 2021, 5 pages.
(Continued)

*Primary Examiner* — Hermon Asres
(74) *Attorney, Agent, or Firm* — FIG. 1 Patents

(57) ABSTRACT

Various aspects relate to a device that receives a configured uplink grant from a base station for semi-persistent uplink transmissions, receives a configuration for a retransmission timer, receives a configuration of a next-generation NodeB (gNB) fixed frame period (FFP) for semi-static channel access in a shared spectrum, detects a downlink transmission burst within gNB-FFP, and obtains a medium access control protocol data unit for a configured uplink transmission that includes a first physical uplink shared channel (PUSCH) transmission. A communications manager establishes that a hybrid automatic repeat request process associated with the first PUSCH transmission is pending so as to preclude performance of the first PUSCH transmission in response to determinations that the first PUSCH transmission is associated with a gNB channel occupancy time (COT), there is a time gap between the downlink transmission burst within the gNB-COT, and the first PUSCH transmission is smaller than a time gap threshold.

20 Claims, 9 Drawing Sheets

(51) Int. Cl.
*H04W 16/14* (2009.01)
*H04W 72/23* (2023.01)

(58) Field of Classification Search
USPC .......................................................... 370/329
See application file for complete search history.

(56) References Cited

OTHER PUBLICATIONS

Mediatek Inc., "On the enhancements for unlicensed band URLLC/IIoT", 3GPP TSG RAN WG1 Meeting #106bis-e, R1-2109576, e-Meeting [retrieved Feb. 27, 2023]. Retrieved from the Internet <https://www.3gpp.org/ftp/TSG_RAN/WG1_RL1/TSGR1_106b-e/Docs/?sortby=daterev>, Oct. 2021, 5 pages.

Nokia, et al., "UL enhancements for IIoT/URLLC in unlicensed controlled environment", 3GPP TSG RAN WG1 #106bis-e, R1-2109138, e-Meeting [retrieved Feb. 27, 2023]. Retrieved from the Internet <https://www.3gpp.org/ftp/TSG_RAN/WG1_RL1/TSGR1_106b-e/Docs/?sortby=daterev>, Oct. 2021, 14 pages.

PCT/US2022/049053, "International Search Report and Written Opinion", PCT Application No. PCT/US2022/049053, Mar. 1, 2023, 13 pages.

"Medium Access Control (MAC) protocol specification", 3rd Generation Partnership Project; Technical Specification Group Radio Access Network, 3GPP TS 38.321 V16.6.0, 3GPP Organizational Partners, Valbonne, France [retrieved Feb. 2, 2022]. Retrieved from the Internet <http://www.3gpp.org>., Sep. 2021, 158 Pages.

"Multiplexing and channel coding", 3rd Generation Partnership Project; Technical Specification Group Radio Access Network, 3GPP TS 38.212 V16.7.0, 3GPP Organizational Partners, Valbonne, France [retrieved Feb. 2, 2022]. Retrieved from the Internet <http://www.3gpp.org>., Sep. 2021, 153 Pages.

"Physical channels and modulation", 3rd Generation Partnership Project; Technical Specification Group Radio Access Network, 3GPP TS 38.211 V16.7.0, 3GPP Organizational Partners, Valbonne, France [retrieved Feb. 1, 2022]. Retrieved from the Internet <http://www.3gpp.org>., Sep. 2021, 134 Pages.

"Physical layer procedures for control", 3rd Generation Partnership Project; Technical Specification Group Radio Access Network, 3GPP TS 38.213 V16.7.0, 3GPP Organizational Partners, Valbonne, France [retrieved Feb. 2, 2022]. Retrieved from the Internet <http://www.3gpp.org>., Sep. 2021, 188 Pages.

"Physical layer procedures for data", 3rd Generation Partnership Project; Technical Specification Group Radio Access Network, 3GPP TS 38.214 V16.7.0, 3GPP Organizational Partners, Valbonne, France [retrieved Feb. 2, 2022]. Retrieved from the Internet <http://www.3gpp.org>., Sep. 2021, 172 Pages.

"Radio Resource Control (RRC) protocol specification", 3rd Generation Partnership Project; Technical Specification Group Radio Access Network, 3GPP TS 38.331 V16.6.0, 3GPP Organizational Partners, Valbonne, France [retrieved Feb. 2, 2022]. Retrieved from the Internet <http://www.3gpp.org>., Sep. 2021, 961 Pages.

"Requirements for support of radio resource management", 3rd Generation Partnership Project; Technical Specification Group Radio Access Network, 3GPP TS 38.133 V16.9.0, 3GPP Organizational Partners, Valbonne, France [retrieved Feb. 1, 2022]. retrieved from the Internet <http://www.3gpp.org>., Sep. 2021, 3225 Pages.

\* cited by examiner

COMMUNICATION OPERATIONS IN A SHARED SPECTRUM

TECHNICAL FIELD

The present disclosure relates to wireless communications, and more specifically to a timeline for ultra-reliable low-latency communication (URLLC) operations in a shared spectrum.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies including third generation (3G) radio access technology, fourth generation (4G) radio access technology, fifth generation (5G) radio access technology, and other suitable radio access technologies beyond 5G.

Generally, uplink transmissions from a communication device (e.g., a user equipment) in an unlicensed band (e.g., below 6 GHz, such as 2.4 GHz to 2.4835 GHz, 5.15 GHz to 5.25 GHz, 5.25 GHz to 5.35 GHz, and 5.725 GHz to 5.825 GHz) using a semi-static channel access mode are associated to a channel occupancy with a corresponding fixed frame period. An uplink transmission can occur if the channel occupancy association assumption is validated and if any applicable sensing condition is met. In the context of a next-generation NodeB (gNB), a communication device needs to detect a downlink transmission burst within the gNB channel occupancy to validate the channel occupancy assumption that the next-generation NodeB (gNB) has initiated the channel occupancy.

SUMMARY

The present disclosure relates to methods, apparatuses, and systems that support implementations of communication operations in a shared spectrum, such as related to the timeline for ultra-reliable low-latency communication (URLLC) operations in a shared spectrum. This disclosure provides solutions considering the impact of next-generation NodeB (gNB) channel occupancy assumption validation on the uplink transmission timeline, including whether to generate and/or transmit a transport block for a medium access control (MAC) protocol data unit (PDU) via a physical uplink shared channel (PUSCH) transmission, particularly if a retransmission timer is configured for a communication device (e.g., user equipment (UE)). Accordingly, for PUSCH repetition type B, when a nominal PUSCH repetition is segmented around a gNB-idle period of a first fixed frame period (FFP) associated with the gNB (referred to as first gNB-FFP), and for a second gNB-FFP, a communication device can detect a downlink transmission burst and determine the length of the transmission burst, such that the device can start a segmented actual repetition after the gNB-idle period, and after the downlink (DL) transmission burst. Additionally, a base station (e.g., a next-generation NodeB (gNB)) can determine the hybrid automatic repeat request process identifier (HARQ process ID) if a PUSCH transmission (such as an actual PUSCH repetition or a nominal PUSCH repetition) from the communication device is not performed. Accordingly, this disclosure also facilitates gNB implementations for the configuration and transmission requirement, such as for scheduling and configuring downlink transmission bursts, and provides to address, simplify, and/or fulfill uplink transmission timeline requirements, such as with respect to channel occupancy assumption validation.

Some implementations of the method and apparatuses described herein may include wireless communication at a device (e.g., user equipment (UE)), which includes receiving a configured uplink grant from a base station (e.g., a next-generation NodeB (gNB)) for semi-persistent uplink transmissions via a serving cell; receiving a timer configuration for a retransmission timer associated with the configured uplink grant; receiving a configuration of a next-generation NodeB fixed frame period for semi-static channel access in a shared spectrum; and detecting a downlink transmission burst within the next-generation NodeB fixed frame period associated with the configuration. The implementations at the device also include obtaining a medium access control protocol data unit for a configured uplink transmission of the semi-persistent uplink transmissions, the configured uplink transmission including at least a first physical uplink shared channel transmission. The implementations at the device also include a communications manager establishing that a hybrid automatic repeat request process associated with the first physical uplink shared channel transmission is pending so as to preclude performance of the first physical uplink shared channel transmission. The performance of the first physical uplink shared channel transmission is precluded in response to determinations that the first physical uplink shared channel transmission is associated with a next-generation NodeB channel occupancy time, there is a time gap between the downlink transmission burst within the next-generation NodeB channel occupancy time, and the first physical uplink shared channel transmission is smaller than a time gap threshold.

Some implementations of the method and apparatuses described herein may further include wireless communication at a base station (e.g., a next-generation NodeB (gNB)), which includes transmitting a configured uplink grant to a device (e.g., user equipment (UE)) for semi-persistent uplink transmissions via a serving cell; transmitting a timer configuration for a retransmission timer associated with the configured uplink grant to the device; and transmitting a downlink transmission burst within a next-generation NodeB fixed frame period associated with a configuration of the next-generation NodeB fixed frame period, the downlink transmission burst being transmitted not later than a time gap threshold prior to a configured uplink transmission when the device is expected to determine if the base station has initiated a channel occupancy time prior to the configured uplink transmission.

BRIEF DESCRIPTION OF THE DRAWINGS

Various aspects of the present disclosure for communication operations in a shared spectrum are described with reference to the following Figures. The same numbers may be used throughout to reference like features and components shown in the Figures.

DETAILED DESCRIPTION

Figure 1:
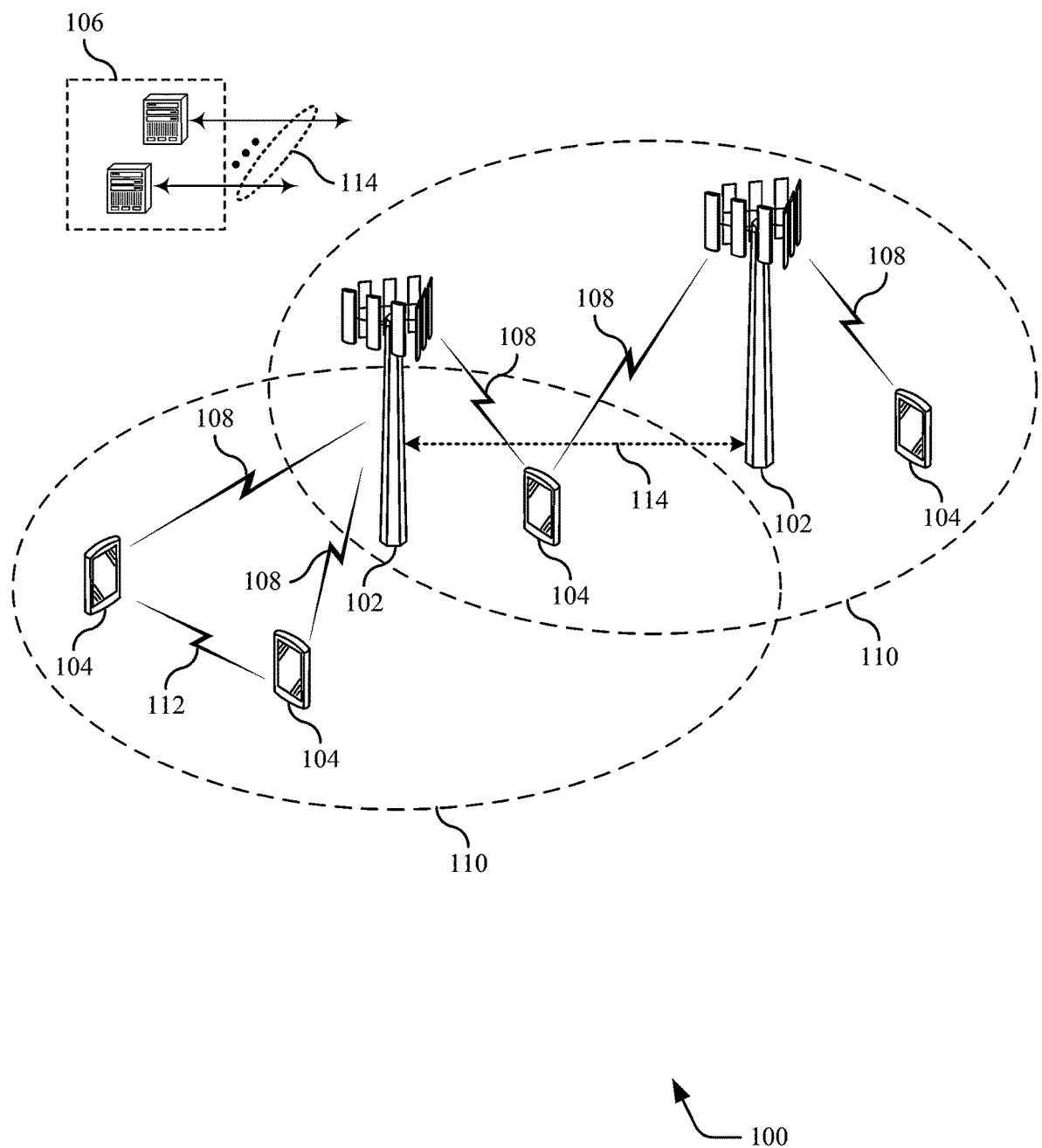
FIG. 1 illustrates an example of a wireless communications system that supports communication operations in a shared spectrum in accordance with aspects of the present disclosure.

Implementations of communication operations in a shared spectrum are described, such as related to the timeline for ultra-reliable low-latency communication (URLLC) operations in a shared spectrum. This disclosure provides solutions considering the impact of next-generation NodeB (gNB) channel occupancy assumption validation on the uplink transmission timeline, including whether to generate and/or transmit a transport block for a medium access control (MAC) protocol data unit (PDU), particularly if a retransmission timer is configured for a communication device (e.g., user equipment (UE)). In implementations, the retransmission timer can be the cg-Retransmission Timer as defined in 3GPP TS 38.321 and TS 38.331.

Generally, uplink transmissions from a communication device (e.g., a user equipment) in an unlicensed band (e.g., below 6 GHz, such as 2.4 GHz to 2.4835 GHz, 5.15 GHz to 5.25 GHz, 5.25 GHz to 5.35 GHz, and 5.725 GHz to 5.825 GHz) using a semi-static channel access mode are associated to a channel occupancy with a corresponding fixed frame period. An uplink transmission can occur if the channel occupancy association assumption is validated and if any applicable sensing condition is met. In the context of a next-generation NodeB (gNB), a communication device needs to detect a downlink transmission burst within the gNB channel occupancy to validate the channel occupancy assumption that the next-generation NodeB (gNB) has initiated the channel occupancy.

Accordingly, aspects of the present disclosure provide that, for physical uplink shared channel (PUSCH) repetition type B, when a nominal PUSCH repetition is segmented around a gNB-idle period of a first fixed frame period (FFP) associated with the gNB (referred to as first gNB-FFP), and for a second gNB-FFP, a communication device can detect a downlink transmission burst and determine the length of the transmission burst, such that the device can start a segmented actual repetition after the gNB-idle period and after the downlink (DL) transmission burst. Additionally, a base station (e.g., a next-generation NodeB (gNB)) can determine the hybrid automatic repeat request process identifier (HARQ process ID) if the uplink transmission from the communication device is not performed. Accordingly, this disclosure also facilitates gNB implementations for the configuration and transmission requirement, such as for scheduling and configuring downlink transmission bursts, and provides to address, simplify, and/or fulfill uplink transmission timeline requirements, such as with respect to channel occupancy assumption validation.

Aspects of the present disclosure are described in the context of a wireless communications system. Aspects of the present disclosure are further illustrated and described with reference to device diagrams and flowcharts that relate to a timeline for ultra-reliable low-latency communication (URLLC) operations in a shared spectrum. Notably, the terms "shared spectrum" and "unlicensed band" can be used interchangeably throughout this disclosure. Users and networks communicating via an unlicensed band or shared spectrum do not need a permission from a licensing agency, such as the FCC (Federal Communications Commission) to perform the communication.

FIG. 1 illustrates an example of a wireless communications system 100 that supports communication operations in a shared spectrum in accordance with aspects of the present disclosure. The wireless communications system 100 may include one or more base stations 102, one or more UEs 104, and a core network 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as an NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNodeB (eNB), a next-generation NodeB (gNB), or other suitable terminology. A base station 102 and a UE 104 may communicate via a communication link 108, which may be a wireless or wired connection. For example, a base station 102 and a UE 104 may perform wireless communication over a Uu interface.

A base station 102 may provide a geographic coverage area 110 for which the base station 102 may support services (e.g., voice, video, packet data, messaging, broadcast, etc.) for one or more UEs 104 within the geographic coverage area 110. For example, a base station 102 and a UE 104 may support wireless communication of signals related to services (e.g., voice, video, packet data, messaging, broadcast, etc.) according to one or multiple radio access technologies. In some implementations, a base station 102 may be moveable, for example, a satellite associated with a non-terrestrial network. In some implementations, different geographic coverage areas 110 associated with the same or different radio access technologies may overlap, but the different geographic coverage areas 110 may be associated with different base stations 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100. In some other implementations, a UE 104 may be mobile in the wireless communications system 100.

The one or more UEs 104 may be devices in different forms or having different capabilities. Some examples of UEs 104 are illustrated in FIG. 1. A UE 104 may be capable of communicating with various types of devices, such as the base stations 102, other UEs 104, or network equipment (e.g., the core network 106, a relay device, an integrated access and backhaul (IAB) node, or another network equipment), as shown in FIG. 1. Additionally, or alternatively, a UE 104 may support communication with other base stations 102 or UEs 104, which may act as relays in the wireless communications system 100.

A UE 104 may also be able to support wireless communication directly with other UEs 104 over a communication link 112. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 112 may be referred to as a sidelink. For example, a UE 104 may support wireless communication directly with another UE 104 over a PC5 interface.

A base station 102 may support communications with the core network 106, or with another base station 102, or both.

For example, a base station 102 may interface with the core network 106 through one or more backhaul links 114 (e.g., via an S1, N2, N2, or another network interface). The base stations 102 may communicate with each other over the backhaul links 114 (e.g., via an X2, Xn, or another network interface). In some implementations, the base stations 102 may communicate with each other directly (e.g., between the base stations 102). In some other implementations, the base stations 102 may communicate with each other indirectly (e.g., via the core network 106). In some implementations, one or more base stations 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

UE PUSCH Preparation Procedure Time

In aspects of this disclosure, user equipment (UE) physical uplink shared channel (PUSCH) preparation procedure time is taken into account, as mainly described in section 6 of 3GPP TS 38.214. Throughout this disclosure, PUSCH preparation time and PUSCH preparation procedure time can be used interchangeably. If the first uplink symbol in the physical uplink shared channel (PUSCH) allocation for a transport block, including the demodulation reference signal (DM-RS), as defined by the slot offset K2 and the start S and length L of the PUSCH allocation, as indicated by 'Time domain resource assignment' of the scheduling downlink control information (DCI), and including the effect of the timing advance, is no earlier than at symbol $L_2$, where $L_2$ is defined as the next uplink symbol with its cyclic prefix (CP) starting:

$$T_{proc,2}=\max((N_2+d_{2,1}+d_2)(2048+144) \cdot k2^{-u} \cdot T_c+T_{ext}+T_{switch}, d_{2,2})$$

after the end of the reception of the last symbol of the physical downlink control channel (PDCCH) carrying the DCI that is scheduling the PUSCH, then the user equipment (UE) shall transmit the transport block.

The UE transmits the transport block based on the following:
The $N_2$ is based on μ of Table 1 and Table 2 (below) for UE processing capability one (1) and two (2) respectively, where μ corresponds to the one of ($μ_{DL}$, $μ_{UL}$) resulting in the largest $T_{proc,2}$, where the $μ_{DL}$ corresponds to the subcarrier spacing of the downlink with which the PDCCH carrying the DCI scheduling the PUSCH was transmitted and $μ_{UL}$ corresponds to the subcarrier spacing of the uplink channel via which the PUSCH is to be transmitted. The κ is defined in clause 4.1 of TS 38.211.

For an operation with a shared spectrum channel access, $T_{ext}$ is calculated according to TS 38.211, otherwise $T_{ext}=0$.

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of a timing difference between component carriers as given in TS 38.133.

If the scheduling DCI triggered a switch of BWP, d2,2 is equal to the switching time as defined in TS 38.133, otherwise d2,2=0.

If a PUSCH of a larger priority index would overlap with a physical uplink control channel (PUCCH) of a smaller priority index, $d_2$ for the PUSCH of a larger priority is set as reported by the UE; otherwise $d_2=0$.

For a UE that supports capability two (2) on a given cell, the processing time according to UE processing capability two (2) is applied if the high layer parameter processingType2Enabled in PUSCH-ServingCellConfig is configured for the cell and set to 'enable'.

If the PUSCH indicated by the DCI is overlapping with one or more PUCCH channels, then the transport block is multiplexed following the procedure in clause 9.2.5 of TS 38.213, otherwise the transport block is transmitted on the PUSCH indicated by the DCI.

If an uplink switching gap is triggered as defined in clause 6.1.6, $T_{switch}$ equals to the switching gap duration, and for the UE configured with higher layer parameter uplinkTxSwitchingOption set to 'dualUL' for uplink carrier aggregation $\mu_{UL}=\min(\mu_{UL,carrier1}, \mu_{UL,carrier2})$, otherwise $T_{switch}=0$.

Otherwise, the UE may ignore the scheduling DCI.

TABLE 1

PUSCH preparation time for PUSCH timing capability one (1)

| μ | PUSCH preparation time N₂ [symbols] |
|---|---|
| 0 | 10 |
| 1 | 12 |
| 2 | 23 |
| 3 | 36 |

TABLE 2

PUSCH preparation time for PUSCH timing capability two (2)

| μ | PUSCH preparation time N₂ [symbols] |
|---|---|
| 0 | 5 |
| 1 | 5.5 |
| 2 | 11 for frequency range 1 |

Operation in an Unlicensed Spectrum

With respect to operation in an unlicensed spectrum, communication devices, to include user equipment (UEs) and network nodes, such as base stations (e.g., a next-generation NodeB (gNB)), operating in an unlicensed spectrum may be required to perform one or more channel access procedures, which may include a clear channel assessment (CCA), such as by performing a listen before talk (LBT) procedure, also referred to as channel sensing, prior to being able to transmit in the unlicensed spectrum (some channel access procedures are described in section 4 of TS 37.213). If the device or network node performing the listen before talk procedure does not detect the presence of other signals in the channel, the medium or channel is considered available for transmission. In a frame-based equipment (FBE) mode of operation, the device or network node performs LBT in an idle period and once the channel or medium is acquired, the device or network node can communicate within the non-idle time of a fixed frame period duration, referred to as the channel occupancy time (COT). In current specifications and regulations, the idle time is not shorter than the maximum of five percent (5%) of the fixed frame period (FFP) and 100 microseconds.

With respect to user equipment (UE)-initiated channel occupancy, a user equipment can perform channel sensing during an idle period of a UE-FFP and access the channel in the next UE-FFP if it senses the channel to be idle at least during a sensing slot duration (e.g., 9 us) within the idle period. The UE initiates a channel occupancy by transmitting an UL/SL transmission at the beginning of the channel occupancy. The UE-initiated channel occupancy has been recently specified for FBE-based equipment, as related to semi-static channel access. UE-initiated channel occupancy may be useful, particularly in low-latency applications when uplink data to be sent in configured grant resources is allowed to initiate a channel occupancy.

It should be noted that throughout this disclosure, the terms U-FFP, u-FFP, and UE-FFP can be used interchangeably. Similarly, G-FFP, g-FFP, and gNB-FFP can be used interchangeably. Similarly, U-COT, u-COT, UE-COT can be used interchangeably. Similarly, G-COT, g-COT, gNB-COT can be used interchangeably. Additionally, a DL transmission burst is defined as a set of transmissions from an eNB/gNB without any gaps greater than 'Q' (e.g., 16 us). Transmissions from an eNB/gNB separated by a gap of more than 'Q' are considered as separate DL transmission bursts. An eNB/gNB can transmit transmission(s) after a gap within a DL transmission burst without sensing the corresponding channel(s) for availability. Further, a UL transmission burst is defined as a set of transmissions from a UE without any gaps greater than 'Q'. Transmissions from a UE separated by a gap of more than 'Q' are considered as separate UL transmission bursts. A UE can transmit transmission(s) after a gap within a UL transmission burst without sensing the corresponding channel(s) for availability.

With respect to multi-PUSCH transmission, a single downlink control information may schedule several transport blocks, referred to as the multi-PUSCH transmission. Notably, if pusch-TimeDomainAllocationListForMultiPUSCH in pusch-Config contains a row indicating resource allocation for two to eight contiguous PUSCHs, K2 indicates the slot where the user equipment shall transmit the first PUSCH of the multiple PUSCHs. Each PUSCH has a separate start and length indicator value (SLIV) and mapping type. The number of scheduled PUSCHs is signaled by the number of indicated valid SLIVs in the row of the pusch-TimeDomainAllocationListForMultiPUSCH signaled in downlink control information format 0_1.

Channel Occupancy Time (COT) Initiator

In aspects of this disclosure, channel occupancy time (COT) initiator operations, as per 3GPP agreements, are taken into consideration. In a semi-static channel access mode, when a configured uplink transmission starts after a user equipment fixed frame period (UE-FFP) boundary and ends before the idle period of that UE-FFP associated to the user equipment, and if the user equipment has already initiated the UE-FFP, then the user equipment assumes that the configured uplink transmission corresponds to a UE-initiated channel occupancy time. Otherwise, if the configured uplink transmission is confined within a gNB-FFP before the idle period of that gNB-FFP, and if the user equipment has already determined that the gNB has initiated the gNB-FFP, then the user equipment assumes that the configured uplink transmission corresponds to a gNB-initiated channel occupancy time.

In the semi-static channel access mode, a UE can operate according to UE-initiated channel occupancy time. A determination is made as to whether a configured uplink transmission that is aligned with a UE-FFP boundary and ends before the idle period of that UE-FFP, is based on UE-initiated channel occupancy time, or is based on sharing a gNB-initiated channel occupancy time. If the configured uplink transmission is confined within a gNB-FFP before the idle period of that gNB-FFP, and the user equipment has already determined that the base station has initiated that gNB-FFP, then the user equipment assumes that the configured uplink transmission corresponds to gNB-initiated channel occupancy time. Otherwise, the user equipment assumes that the configured uplink transmission corresponds to UE-initiated channel occupancy time.

In the semi-static channel access mode, for physical uplink shared channel (PUSCH) repetition type B, if a nominal repetition overlaps with a set of symbols in an idle period associated to the gNB-FFP of a base station, and if the user equipment shares gNB-initiated channel occupancy time for the nominal repetition or is associated to the UE-FFP of the user equipment, and if the user equipment assumes UE-initiated channel occupancy time for the nominal repetition, then all of the symbols in the idle period should be considered as invalid symbols, which are not considered (e.g., for transmission) for an actual repetition. Segmentation before and/or after the idle period is applied when applicable.

In the semi-static channel access mode, a downlink transmission burst based on sharing of a UE-initiated channel occupancy time corresponding to a UE-FFP shall include a scheduled downlink transmission or downlink control information intended for the user equipment that initiated the UE-FFP. A downlink transmission to any other user equipment in the cell, other than the user equipment initiating the channel occupancy time and/or a broadcast transmission, can be additionally included in the downlink transmission burst if the base station fulfills the following condition: It is the responsibility of the base station to ensure that other user equipments (UEs) do not assume gNB-initiated channel occupancy time-based transmission for an uplink transmission based on the detection of any transmission in the downlink transmission burst.

Partial Cancellation Capability

In aspects of this disclosure, partial cancellation (e.g., [partialcancellation]) capability is taken into consideration, and a user equipment may operate on a single carrier in an unpaired spectrum. If the user equipment is configured by higher layers to transmit a sounding reference signal (SRS) (from UE to gNB), or physical uplink control channel (PUCCH), or physical uplink shared channel (PUSCH), or physical random access channel (PRACH) in a set of symbols of a slot and the user equipment detects a downlink control information format indicating to the user equipment to receive channel-state information reference signal (CSI-RS) or physical downlink shared channel (PDSCH) in a subset of symbols from the set of symbols, then partial cancellation is determinable. If the user equipment does not indicate the capability of partial cancellation, then the user equipment does not expect to cancel the transmission of the PUCCH or PUSCH or PRACH in the set of symbols if the first symbol in the set occurs within $T_{proc,2}$ relative to a last symbol of a control resource set (CORESET) where the user equipment detects the downlink control information format; otherwise, the user equipment cancels the PUCCH, or the PUSCH, or an actual repetition of the PUSCH, as determined from clauses 9 and 9.2.5, or clause 6.1 of TS38.214, or the PRACH transmission in the set of symbols. If the user equipment does indicate the capability of partial cancellation, then the user equipment does not expect to cancel the transmission of the PUCCH or PUSCH or PRACH in the set of symbols that occur within $T_{proc,2}$ relative to a last symbol of a CORESET where the user equipment detects the downlink control information format. The user equipment cancels the PUCCH, or the PUSCH, or an actual repetition of the PUSCH, as determined from clauses 9 and 9.2.5, or clause 6.1 of TS 38.214, or the PRACH transmission in remaining symbols from the set of symbols.

PUSCH Repetition Type B

In aspects of this disclosure, physical uplink shared channel (PUSCH) repetition type B is taken into consideration, which enables each repetition of a transport block to be performed in contiguous symbols without any time gap. The number of nominal repetitions of a transport block is indicated via downlink control information scheduling the transport block repetitions (or via an activation DCI that activates configured grant transmissions in case of configured grant type 2). A "nominal repetition" can be divided into two or more "actual repetitions", where there may be downlink symbols and/or invalid symbols between two adjacent actual repetitions of a nominal repetition. For PUSCH repetition type B, the user equipment determines invalid symbol(s) for PUSCH repetition type B transmission as described in the following instances.

A symbol that is indicated as downlink by tdd-UL-DL-ConfigurationCommon or tdd-UL-DL-ConfigurationDedicated is considered an invalid symbol for PUSCH repetition type B transmission. For operation in an unpaired spectrum, symbols indicated by ssb-PositionsInBurst in SIB1 (System Information Block 1) or ssb-PositionsInBurst in ServingCellConfigCommon for reception of SS/PBCH blocks are considered as invalid symbols for PUSCH repetition type B transmission. For operation in an unpaired spectrum, symbol(s) indicated by pdcch-ConfigSIB1 in MIB (Master Information Block) for a CORESET for Type0-PDCCH (physical downlink control channel) CSS (common search space) set are considered as invalid symbol(s) for PUSCH repetition type B transmission. For operation in an unpaired spectrum, if numberOfInvalidSymbolsForDL-UL-Switching is configured, then numberOfInvalidSymbolsForDL-UL-Switching symbol(s) after the last symbol that is indicated as a downlink in each consecutive set of all symbols that are indicated as downlink by tdd-UL-DL-ConfigurationCommon or tdd-UL-DL-ConfigurationDedicated are considered as invalid symbol(s) for PUSCH repetition type B transmission. The symbol(s) given by numberOfInvalidSymbolsForDL-UL-Switching are defined using the reference SCS configuration referenceSubcarrierSpacing provided in tdd-UL-DL-ConfigurationCommon.

A user equipment may be configured with the higher layer parameter invalidSymbolPattern, which provides a symbol level bitmap spanning one or two slots (higher layer parameter symbols given by invalidSymbolPattern). A bit value equal to one (1) in the symbol level bitmap symbols indicates that the corresponding symbol is an invalid symbol for PUSCH repetition type B transmission. The user equipment may be additionally configured with a time-domain pattern (higher layer parameter periodicityAndPattern given by invalidSymbolPattern), where each bit of periodicityAndPattern corresponds to a unit equal to a duration of the symbol level bitmap symbols, and a bit value equal to one (1) indicates that the symbol level bitmap symbols is present in the unit. The periodicityAndPattern can be {1, 2, 4, 5, 8, 10, 20 or 40} units long, but a maximum of forty (40) msec. The first symbol of periodicityAndPattern every forty (40) msec/P periods is a first symbol in frame nf mod 4=0, where P is the duration of periodicityAndPattern-r16 in units of msec. When periodicityAndPattern is not configured, for a symbol level bitmap spanning two slots, the bits of the first and second slots correspond respectively to even and odd slots of a radio frame, and for a symbol level bitmap spanning one slot, the bits of the slot correspond to every slot of a radio frame.

If invalidSymbolPattern is configured, then whether the user equipment applies the invalid symbol pattern is determined as follows: If the PUSCH is scheduled by DCI format 0_1, or corresponds to a Type 2 configured grant activated by DCI format 0_1, and if invalidSymbolPatternIndicatorDCI-0-1 is configured, and if the invalid symbol pattern indicator field is set to one (1), the user equipment applies the invalid symbol pattern; otherwise, the UE does not apply the invalid symbol pattern. If the PUSCH is scheduled by DCI format 0_2, or corresponds to a Type 2 configured grant activated by DCI format 0_2, and if invalidSymbolPatternIndicatorDCI-0-2 is configured, and if the invalid symbol pattern indicator field is set to one (1), the user equipment applies the invalid symbol pattern; otherwise, the user equipment does not apply the invalid symbol pattern. Otherwise, the user equipment applies the invalid symbol pattern. The DCI formats are defined TS 38.212.

If the user equipment is configured with multiple serving cells within a cell group and is provided with directionalCollisionHandling-r16='enabled' for a set of serving cell(s) among the multiple serving cells, and indicates support of half-DuplexTDD-CA-SameSCS-r16 capability, and is not configured to monitor PDCCH for detection of DCI format 2-0 on any of the multiple serving cells, then a symbol indicated to the user equipment for reception of SS/PBCH blocks in a first cell of the multiple serving cells by ssb-PositionsInBurst in SIB1 or ssb-PositionsInBurst in ServingCellConfigCommon is considered as an invalid symbol for PUSCH repetition type B transmission in: any of the multiple serving cells if the user equipment is not capable of simultaneous transmission and reception as indicated by simultaneousRxTxInterBandCA among the multiple serving cells, and any one of the cells corresponding to the same band as the first cell, irrespective of any capability indicated by simultaneousRxTxInterBandCA; and a symbol is considered as an invalid symbol in another cell among the set of serving cell(s) provided with directionalCollisionHandling-r16 for PUSCH repetition type B transmission with Type 1 or Type 2 configured grant except for the first Type 2 PUSCH transmission (including all repetitions) after activation if the symbol is indicated as downlink by tdd-UL-DL-ConfigurationCommon or tdd-UL-DL-Configuration-Dedicated on the reference cell as defined in clause 11.1 of TS 38.213, or the user equipment is configured by higher layers to receive PDCCH, PDSCH, or CSI-RS on the reference cell in the symbol.

For PUSCH repetition type B, after determining the invalid symbol(s) for PUSCH repetition type B transmission for each of the K nominal repetitions, the remaining symbols are considered as potentially valid symbols for PUSCH repetition type B transmission. If the number of potentially valid symbols for PUSCH repetition type B transmission is greater than zero for a nominal repetition, the nominal repetition consists of one or more actual repetitions, where each actual repetition consists of a consecutive set of all potentially valid symbols that can be used for PUSCH repetition type B transmission within a slot. An actual repetition with a single symbol is omitted except for the case of L=1, where 'L' is the allocation length defined in TS 38.214, clause 6.1.2.1. An actual repetition is omitted according to the conditions in clause 9, clause 11.1, and clause 11.2A of TS38.213. The user equipment shall repeat the transport block across actual repetitions.

For PUSCH repetition type B, when a user equipment receives a downlink control information that schedules aperiodic channel state information (CSI) report(s) or activates semi-persistent CSI report(s) on PUSCH with no transport block by a 'CSI request' field on a downlink control information, the number of nominal repetitions is always assumed to be one (1), regardless of the value of numberOfRepetitions. When the user equipment is scheduled to transmit a PUSCH repetition type B with no transport block and with aperiodic or semi-persistent CSI report(s) by a 'CSI request' field on a downlink control information, the first nominal repetition is expected to be the same as the first actual repetition. For PUSCH repetition type B carrying semi-persistent CSI report(s) without a corresponding PDCCH after being activated on PUSCH by a 'CSI request' field on a downlink control information, if the first nominal repetition is not the same as the first actual repetition, then the first nominal repetition is omitted; otherwise, the first nominal repetition is omitted according to the conditions in clause 9, clause 11.1, and clause 11.2A of TS38.213.

cg-RetransmissionTimer

In aspects of this disclosure, the cg-Retransmission Timer (also referred to as the retransmission timer) is taken into account. For configured uplink grants configured with the cg-Retransmission Timer, the user equipment implementation selects a hybrid automatic repeat request process identifier (HARQ process ID) among the HARQ process IDs that are available for the configured grant configuration. For HARQ process ID selection, the user equipment shall prioritize retransmissions before initial transmissions, and the user equipment shall toggle the new data indicator (NDI) in the configured grant uplink control information (CG-UCI) for new transmissions and not toggle the NDI in the CG-UCI in retransmissions. The cg-Retransmission Timer indicates the initial value of the configured retransmission timer (see TS 38.321) in multiples of periodicity. The value of cg-Retransmission Timer is always less than or equal to the value of configuredGrantTimer, and this field is configured for operation with shared spectrum channel access together with harq-ProcID-Offset. This field is not configured for operation in a licensed spectrum or simultaneously with harq-ProcID-Offset2. The radio resource control (RRC) configures the cg-Retransmission Timer parameters when retransmissions on a configured uplink grant are configured: the cg-RetransmissionTimer determines the duration after a configured grant (re)transmission of a HARQ process when the user equipment shall not autonomously retransmit that HARQ process.

Communication Operations in an Unlicensed Band

In aspects of the present disclosure, mechanisms to determine a timeline for uplink transmission in a next-generation NodeB (gNB) fixed frame period are described. A next-generation NodeB (gNB) is also referred to herein as a base station, or network station. Typically, for a device (e.g., user equipment (UE)) to cancel an uplink transmission, there is generally a cancellation timeline to be respected relative to downlink control information (DCI) reception leading to the cancellation (e.g., for uplink cancellation as described in clause 11.2A of TS 38.213 or DCI indicating CSI-RS/ PDSCH reception as described in section 11.1 of TS 38.213). As referred to herein, an uplink transmission may include any one or more of a physical uplink control channel (PUCCH), a sounding reference signal (SRS), a physical uplink shared channel (PUSCH), or a physical random access channel (PRACH).

In instances when the user equipment needs to detect a downlink (DL) transmission burst in order to validate a gNB channel occupancy time (COT) prior to an uplink transmission, and if a downlink DCI schedules the downlink transmission burst, or part of the downlink transmission burst, the user equipment needs to receive the downlink control information well in advance so that it has enough time to cancel the uplink transmission if needed, such as based on the reception of the downlink control information. The user equipment can cancel the uplink transmission in a subset of symbols of the set of symbols of the uplink transmission. Since the uplink transmission should not start prior to the validation of the gNB channel occupancy time, the base station is expected to send the downlink DCI not later than a certain time prior to the uplink transmission. This certain time prior to the uplink transmission can be derived from a physical uplink shared channel (PUSCH) processing and preparation capability, such as Tproc,2 or $T'_{proc,2}$ as defined in TS 38.214, and TS 38.213, respectively.

If the user equipment indicates the capability of partial cancellation (e.g., [partialcancellation]) as defined and referred to in 3GPP specifications, then a subset of symbols where the uplink transmission is not going to happen needs to be determined. In an implementation, if the user equipment is not configured with any configured downlink transmission, including a configured semi-persistent scheduling (SPS) physical downlink shared channel (PDSCH), or a configured channel-state information reference signal (CSI-RS) in a second gNB-FFP prior to an uplink transmission in the second gNB-FFP scheduled via a first downlink control information (DCI) in a first gNB fixed frame period (FFP), then the user equipment (UE) tries to detect a downlink (DL) transmission burst by gNB in the second gNB-FFP at least a certain time 'w' prior to the uplink (UL) transmission. According to an implementation for detecting the DL transmission burst, the UE expects a downlink control information monitoring occasion within the second gNB-FFP to occur at least a certain duration of time prior to the first symbol of the uplink transmission, i.e. the time gap between the last symbol of the first DCI monitoring occasion in the second gNB-FFP and the first symbol of the UL transmission should span at least the duration 'w'. Otherwise, the user equipment would not perform the uplink transmission. In an example, the user equipment (UE) expects to be configured with downlink (DL) resources, such as semi-persistent PDSCH or PDCCH monitoring occasions certain a time prior to a scheduled/configured uplink (UL) transmission or a repetition of the UL transmission within a gNB-FFP at least if the user equipment (UE) needs to validate the gNB as the channel occupancy time (COT) initiator prior to the UL transmission.

Figure 2:
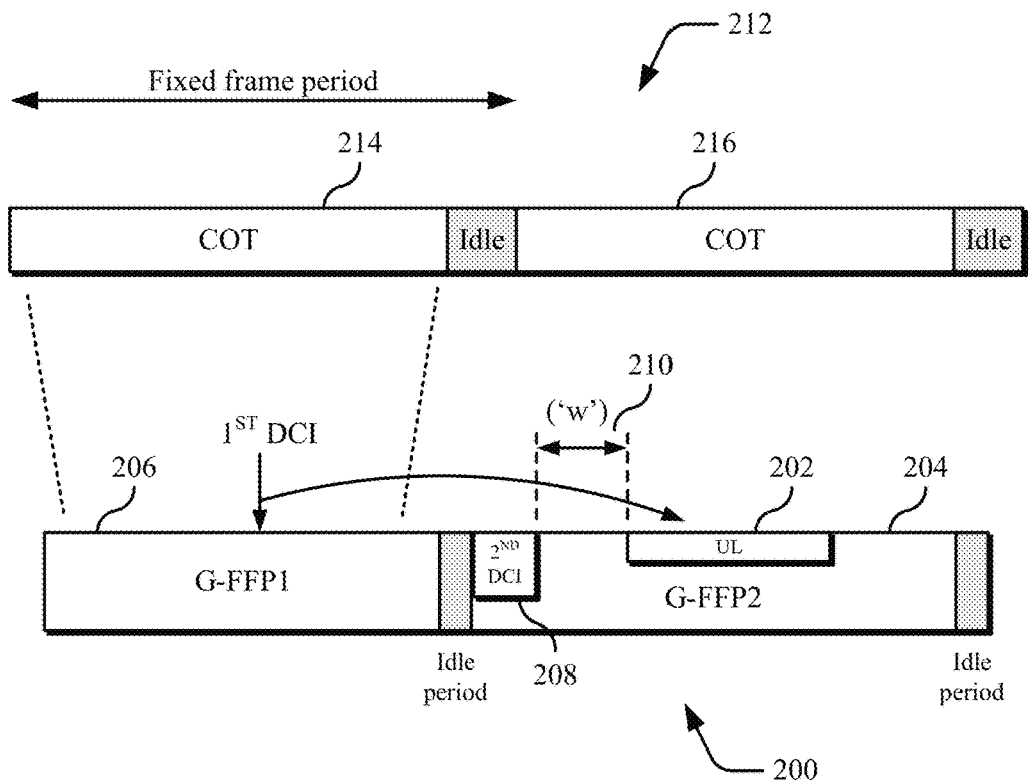
FIG. 2 illustrates an example of an uplink transmission being scheduled as related to communication operations in a shared spectrum in accordance with aspects of the present disclosure.

FIG. 2 illustrates an example 200 of an uplink transmission 202 in a second gNB-FFP 204 (G-FFP2) being scheduled in a first gNB-FFP 206 (G-FFP1), and the user equipment (UE) 104 needs to verify whether the base station 102 has acquired the gNB channel occupancy time (COT) of the second gNB-FFP prior to the uplink transmission. The user equipment expects a downlink control information (DCI) 208) monitoring occasion within the second gNB-FFP 204 to occur at least a certain time duration (V) 210 prior to the first symbol of the uplink transmission. Otherwise, the user equipment would not perform the uplink transmission. FIG. 2 also illustrates a fixed frame period structure 212, which illustrates two fixed frame periods 214, 216, each as channel occupancy time and associated idle period. Notably, a UE can be configured with gNB-FFP and/or with UE-FFP, as illustrated in the examples described herein.

Figure 3:
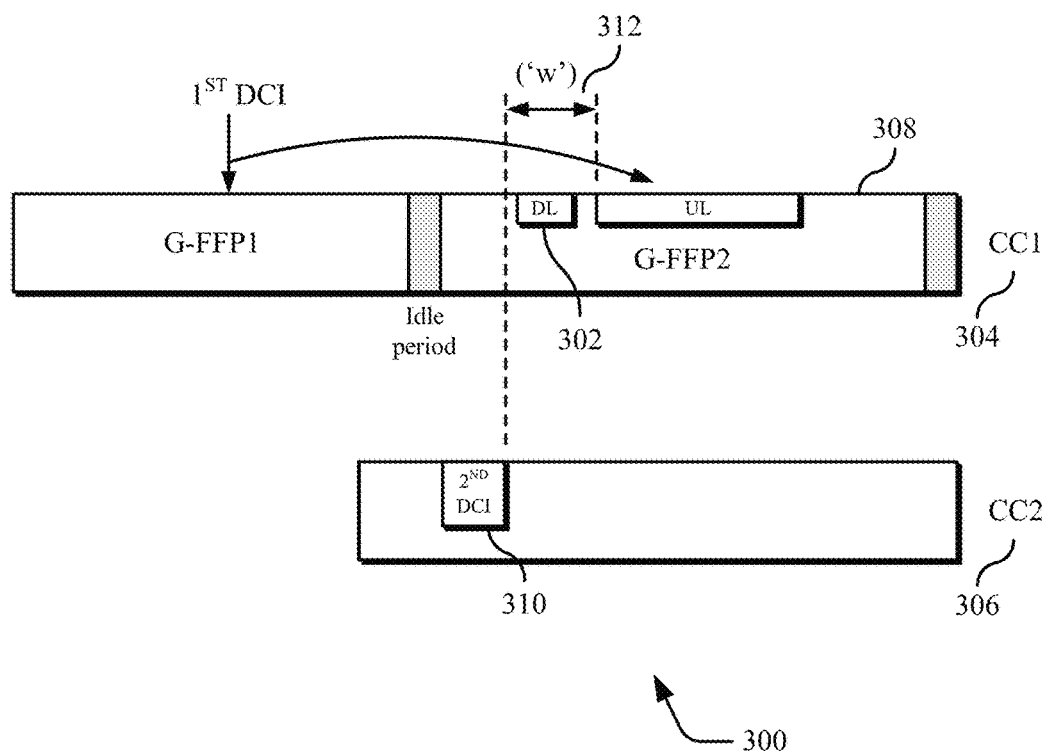
FIG. 3 illustrates an example of a downlink transmission burst as related to communication operations in a shared spectrum in accordance with aspects of the present disclosure.

FIG. 3 further illustrates an example 300 of a downlink transmission burst 302 in a first component carrier (CC1) 304 being scheduled in a second component carrier (CC2) 306. In this example 300, cross carrier scheduling of the downlink transmission burst 302 in a second gNB-FFP 308 (G-FFP2) by a second downlink control information (DCI) 310 is sent in the second component carrier (CC2) 306, and the time duration (V) 312 is determined based on a reference subcarrier spacing (SCS). For example, the reference subcarrier spacing (SCS) is the smallest or largest of the subcarrier spacing of the first component carrier (CC1) 304 and the second component carrier (CC2) 306.

In instances when the user equipment is configured with physical uplink shared channel (PUSCH) repetition type B, the user equipment needs to determine the invalid symbols associated to the PUSCH repetition bundle. The downlink control information (DCI) that is scheduling the PUSCH repetition bundle or activating PUSCH repetition type B transmissions on configured UL resources could indicate the invalid symbol pattern according to the higher layer parameter invalidSymbolPattern. Additionally, there may be semi-statically configured invalid symbols, such as determined via higher layer parameters, including tdd-UL-DL-ConfigurationCommon, tdd-UL-DL-ConfigurationDedicated, and ssb-PositionsInBurst; or SIB1 or MIB indications such as ssb-PositionsInBurst and pdcch-ConfigSIB1; or a higher layer parameter, such as numberOfInvalidSymbolsForDL-UL-Switching, and downlink symbols determined based on higher layer parameters, such as tdd-UL-DL-Configuration-Common and tdd-UL-DL-ConfigurationDedicated. For the above determinations of the invalid symbols, the user equipment has at least Tproc,2 (as defined in TS 38.214) time gap between the time it is made aware of invalid symbols (e.g., via reception of a DCI) and the time the PUSCH is to be transmitted.

After determining the invalid symbol(s) for a PUSCH repetition type B transmission for each of the K nominal repetitions, the remaining symbols are considered as potentially valid symbols for PUSCH repetition type B transmission. If the number of potentially valid symbols for PUSCH repetition type B transmission is greater than zero for a nominal repetition, the nominal repetition consists of one or more actual repetitions, where each actual repetition consists of a consecutive set of all potentially valid symbols that can be used for PUSCH repetition type B transmission within a slot. An actual repetition is omitted according to the conditions in clause 9, clause 11.1, and clause 11.2A of TS38.213. The user equipment shall repeat the transport block across actual repetitions. The redundancy version to be applied on the nth actual repetition, with the counting including the actual repetitions that are omitted, is determined according to TS 38.214. Additionally, the term "slot" includes the terms mini-slot, subslot, and/or aggregated slots, as defined in TS38.211, TS38.213, and TS38.214. In implementations, the UE has sufficient time to perform the omission of each actual repetition, such as determined based on Tproc,2 from the instance of reception of an indication leading to omission of the actual repetition to the instance of omission of the actual repetition.

In instances when the user equipment needs to detect a downlink transmission burst in order to validate a gNB channel occupancy time (COT) prior to uplink transmission, the user equipment can still determine the invalid symbols as described above, assuming the base station can acquire the gNB-COT, and omit resulting actual repetitions based on the procedures described above, as well as based on the actual detection of the downlink transmission burst. The length of the downlink transmission burst is known to the user equipment by reading downlink control information that is scheduling the downlink transmission burst, or based on higher layer parameters. In the case of a downlink DCI scheduling the downlink transmission burst, or a part of the downlink transmission burst, the user equipment needs to receive the downlink DCI well in advance, so that it has enough time for omitting actual repetitions if needed, such as based on the reception of the downlink DCI.

Figure 4:
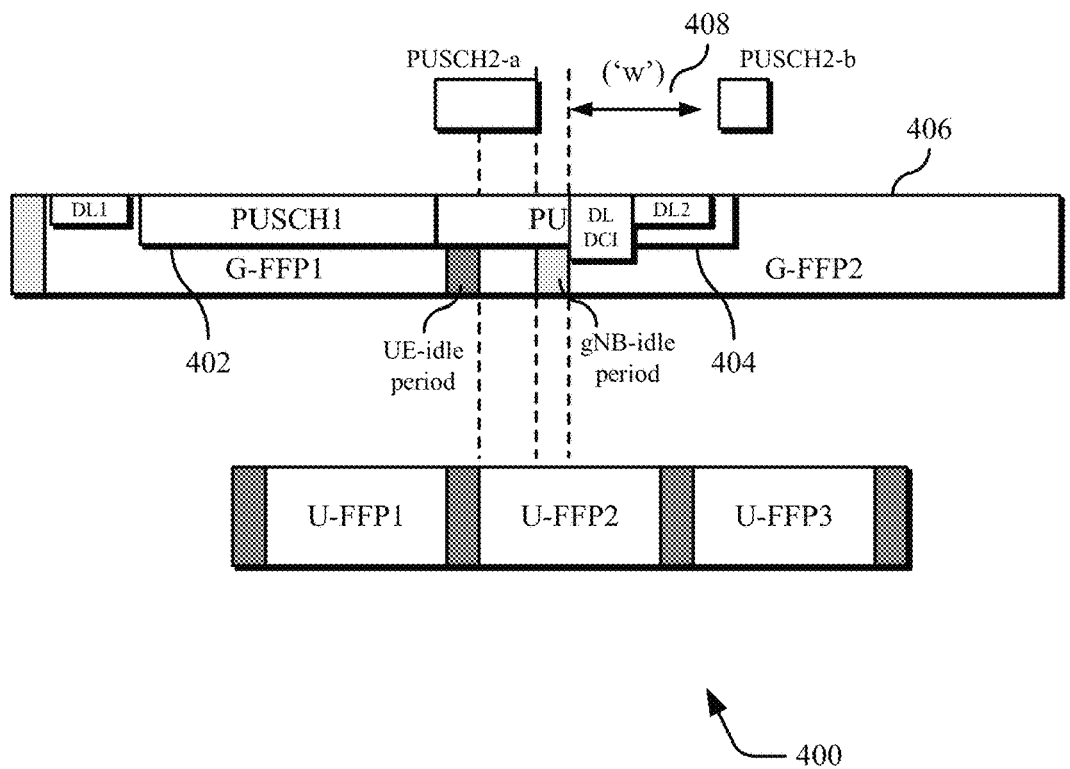
FIG. 4 illustrates an example of PUSCH repetition type B with two nominal PUSCH repetitions as related to communication operations in a shared spectrum in accordance with aspects of the present disclosure.

FIG. 4 illustrates an example 400 of PUSCH repetition type B with two nominal PUSCH repetitions, PUSCH1 402 and PUSCH2 404. The user equipment determines additional invalid symbols including symbols from the beginning of a second gNB-FFP 406 (G-FFP2) until certain symbols and/or invalid symbols for a time duration (V) 408 after a first downlink DCI monitoring occasion in the second gNB-FFP 406 (G-FFP2). For example, the symbols are shown within the window of the time duration ('w') 408 are considered to be invalid symbols. In addition to the existing procedures to determine the invalid symbols, the user equipment can determine the additional invalid symbol(s) for PUSCH repetition type B transmission from the start of a gNB-FFP boundary until a certain time after a first downlink DCI monitoring occasion within the gNB-FFP, where the downlink DCI monitoring occasion can have downlink DCI candidates scheduling a downlink transmission burst. In a related implementation, the last symbol of a CORESET, where the user equipment detects the DCI format indicating to the user equipment to receive the downlink transmission burst, is the starting time instance from which the window of the time duration (V) 408 is calculated. In a related example, all symbols from the starting boundary of the second gNB-FFP 406 (G-FFP2) until the beginning of the window of the time duration ('w') 408 are also considered invalid symbols according to PUSCH repetition type B.

Determine Transport Block/MAC-PDU

In aspects of this disclosure, mechanisms are provided to determine whether to generate and/or transmit a transport block for medium access control (MAC) protocol data unit (PDU). If the user equipment detects a downlink transmission burst in a gNB-FFP prior to user equipment uplink transmission in a set of uplink resources, the user equipment performs the uplink transmission if the time gap between the start of the uplink transmission and validation of the downlink transmission burst ('g') is larger than a time gap threshold ('T'). For example, ('g') is defined to be the time gap between the last or first symbol of the downlink transmission burst, and the first symbol of the uplink transmission. As referred to in this disclosure, ('G') refers to the number of OFDM/SC-FDMA symbols of the time gap ('g'). Accordingly ('G') is determined with respect to $\mu_{DL}$ or $\mu_{UL}$, where $\mu_{DL}$ corresponds to the subcarrier spacing of the downlink where the DL transmission burst is detected and $\mu_{UL}$ corresponds to the subcarrier spacing of the uplink channel with which the PUSCH is to be transmitted. In a specific implementation ('G') is determined according to one of ($\mu_{DL}$, $\mu_{UL}$) resulting in the largest T. The time gap threshold ('T') is determined based on Tproc,2 or 'N2' defined in clause 6.4 of TS 38.214. In a specific implementation, the time gap threshold ('T') is determined according to one of ($\mu_{DL}$, $\mu_{UL}$) resulting in the largest T. In an example, the uplink transmission is a configured grant PUSCH transmission, and in another example, performing the uplink transmission includes transmitting a transport block. In an implementation, The 'N2' is based on μ of Table 1 and Table 2 of clause 6.4 of TS 28.214 for UE processing capability one (1) and two (2) respectively, where μ corresponds to one of (μDL1, μDL2, μUL) resulting in the largest Tproc,2, where the μDL1 corresponds to the subcarrier spacing of the downlink with which the PDCCH carrying the DCI scheduling the PUSCH was transmitted; the μDL2 corresponds to the subcarrier spacing of the downlink transmission burst; and μUL corresponds to the subcarrier spacing of the uplink channel via which the PUSCH is to be transmitted.

In an implementation, a retransmission timer (e.g., the cg-RetransmissionTimer) is configured and the hybrid automatic repeat request (HARQ) entity obtains a MAC-PDU to transmit, the time gap ('g') is smaller than the time gap threshold ('T'), and the corresponding HARQ process is established as pending. Alternatively, when the time gap ('g') is smaller than the time gap threshold ('T'), a listen before talk (LBT) failure is indicated, such as from the lower layers by the user equipment. In an implementation, when the time gap 'g' is smaller than the time gap threshold ('T') and the PUSCH resource is a configured uplink grant (CG PUSCH), the listen before talk (LBT) failure is indicated (from lower layers by the UE). Autonomous retransmission of the MAC-PDU is performed by the user equipment on the next available configured grant resource that satisfies the criteria for an autonomous retransmission, such as the criteria defined in clauses 5.4.2 and 5.8.2 of TS 38.321. In an example, the autonomous retransmission of the MAC-PDU is performed on a configured grant (CG) resource if the retransmission timer is not running and the HARQ process corresponding to that CG resource is pending.

In related implementations, when the uplink transmission is dynamically scheduled (e.g., via PDCCH), the user equipment performs the uplink transmission irrespective of the time gap ('g') value. In another implementation, when the uplink transmission is dynamically scheduled (e.g., via PDCCH), the user equipment ignores and/or discards the dynamic grant (PDCCH) if the time gap ('g') has a shorter duration (also smaller/not larger) than the time gap threshold ('T'). In an implementation, the user equipment is not expected to receive or detect a first downlink transmission burst within a gNB-FFP, where the last or the first symbol of the first downlink transmission burst is received or detected after (not earlier) than the number of OFDM/SC-FDMA ('G') symbols prior to the uplink transmission, and if the user equipment has not received or detected any other downlink transmission burst within the gNB-FFP prior to the first downlink transmission burst. In a related implementation, the base station is expected to transmit a downlink transmission burst before (not later) than the number of OFDM/SC-FDMA ('G') symbols prior to the uplink transmission. Additionally and related, the base station is expected to transmit a downlink transmission burst before (not later) than the number of OFDM/SC-FDMA ('G') symbols prior to the uplink transmission when the user equipment is expected to determine whether the base station has initiated a channel occupancy time prior to a potential uplink transmission (e.g., a scheduled UL transmission or a configured UL resource).

In an implementation, if the medium access control (MAC) entity is configured with at least one of skipUplinkTxDynamic, enhancedSkipUplinkTxDynamic, and enhancedSkipUplinkTxConfigured with value true and the grant indicated to the hybrid automatic repeat request (HARQ) entity was addressed to a cell radio network temporary identifier (C-RNTI), or the grant indicated to the HARQ entity is a configured uplink grant and the time gap ('g') is smaller than the time gap threshold ('T'), then no MAC service data unit (SDU) is included in the MAC PDU. In the case of skipping a dynamic grant, there is no packet loss since no MAC PDU is generated. For a configured grant, and if there is no data, then the resource is skipped resulting in no uplink transmission. If the cg-Retransmission Timer is not configured, for a configured grant transmission for which the DL transmission burst is detected later than a certain time, and the transmission is skipped in response to the late detection of the DL transmission burst, the transport block is lost if the time gap ('g') is a short time duration. In a related example, the user equipment is expected to be configured with the retransmission timer to avoid potential packet loss if the time gap ('g') is of a short time duration. In a related implementation, the user equipment is expected to be configured with the cg-RetransmissionTimer at least for configured grant transmissions within a gNB-FFP (or associated with gNB-COT).

Figure 5:
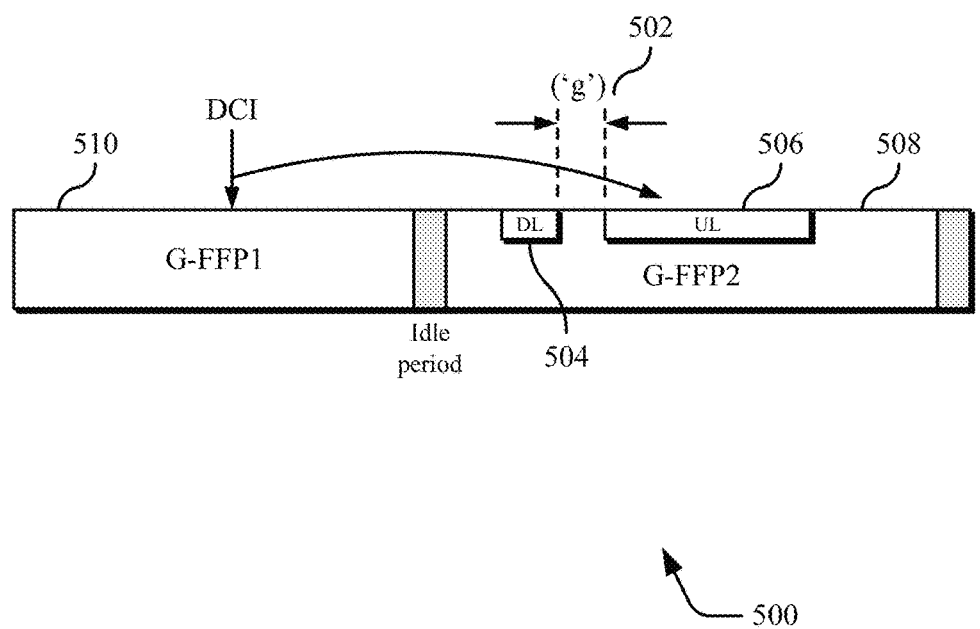
FIG. 5 illustrates an example of a time gap between a downlink transmission burst and an uplink transmission as related to communication operations in a shared spectrum in accordance with aspects of the present disclosure.

FIG. 5 illustrates an example 500 of a time gap ('g') 502 between a downlink transmission burst 504 and an uplink transmission 506 to occur within the second gNB-FFP 508 (G-FFP2). The uplink transmission 506 in the second gNB-FFP 508 (G-FFP2) being scheduled in a first gNB-FFP 510 (G-FFP1), and the user equipment (UE) 104 needs to verify whether the base station 102 has acquired the gNB channel occupancy time (COT) of the second gNB-FFP 508 prior to the uplink transmission.

In other implementations, if the HARQ buffer of the HARQ process associated with the uplink resources (e.g., as indicated in the uplink DCI) is empty and the user equipment receives downlink control information requesting a retransmission for the HARQ process, the user equipment (UE) considers the retransmission grant as an initial grant and generates a transport block according to the downlink control information. According to an implementation, the UE considers the retransmission grant as a grant with a toggled new data indicator (NDI).

The user equipment is expected to trigger an autonomous retransmission with a configuration or timer, which may be different than, or the same as, that of the cg-RetransmissionTimer in an event the time gap ('g') is smaller than the time gap threshold ('T') for a configured uplink transmission. In another implementation, if the user equipment indicates the capability of partial cancellation (e.g., [partialCancellation]), the user equipment does not expect to cancel the transmission of the PUCCH or PUSCH or PRACH in symbols from the set of symbols that occur within certain time (e.g., $T_{proc,2}$) relative to a last/first symbol of the downlink (DL) transmission burst. The user equipment cancels the PUCCH, or the PUSCH, or an actual repetition of the PUSCH, as determined from clauses 9 and 9.2.5, or clause 6.1 of TS 38.214, or the PRACH transmission in remaining symbols from the set of symbols. In an implementation, the user equipment (UE) is not expected to receive a DCI in a first gNB-FFP scheduling an uplink (UL) transmission in a second gNB-FFP, where the UL transmission is to be started from a time instance that is within a time window ('w') from the beginning of the second gNB-FFP, where ('W') can be determined from at least one of: PUSCH preparation time (e.g., as defined in section 6.4 of TS 38.214); higher layer configuration; or PDCCH/search space configuration, such as search space periodicity.

In aspects of this disclosure taking into account PUSCH repetition type B, a user equipment may not determine in advance which idle period (u-idle or g-idle) the UE performs the segmentation around. Also, when a nominal PUSCH repetition is segmented around a gNB-idle period, such as for the second gNB-FFP (G-FFP2) as shown in FIG. 6, the user equipment needs to detect a downlink transmission burst and determine the length of the downlink transmission burst such that it can start the segmented actual repetition after the gNB-idle period.

Figure 6:
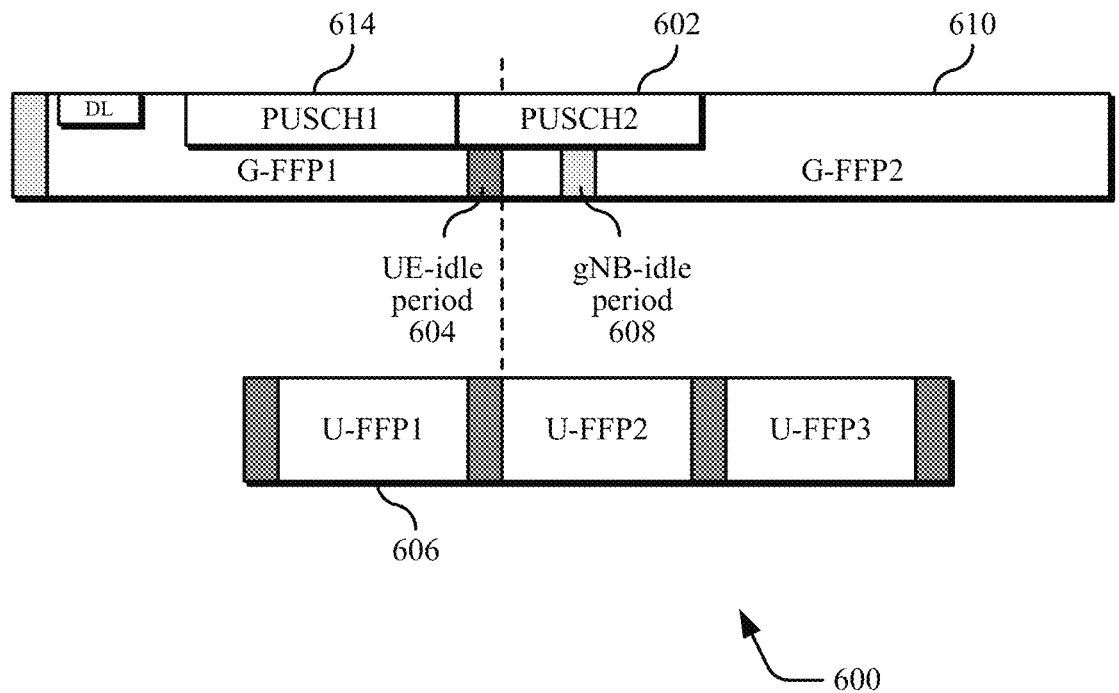
FIG. 6 illustrates an example of PUSCH repetition type B as related to communication operations in a shared spectrum in accordance with aspects of the present disclosure.

FIG. 6 illustrates an example 600 of PUSCH repetition type B, where a second PUSCH repetition 602 (PUSCH2) overlaps both the UE-idle period 604 of a UE-FFP 606 (U-FFP1) and the gNB-idle period 608 of a second gNB-FFP 610 (G-FFP2). In an implementation, a nominal PUSCH repetition (e.g., the PUSCH2 repetition 602) is not expected to overlap with idle periods of both a UE-FFP 606 and a gNB-FFP 610. Similarly, a first nominal PUSCH repetition 614 (PUSCH1) is not expected to overlap with idle periods of both a UE-FFP 606 and a gNB-FFP 610, whereas a subsequent nominal PUSCH repetition can overlap with the idle periods 604, 608 of both the UE-FFP 606 and the gNB-FFP 610.

Figure 7:
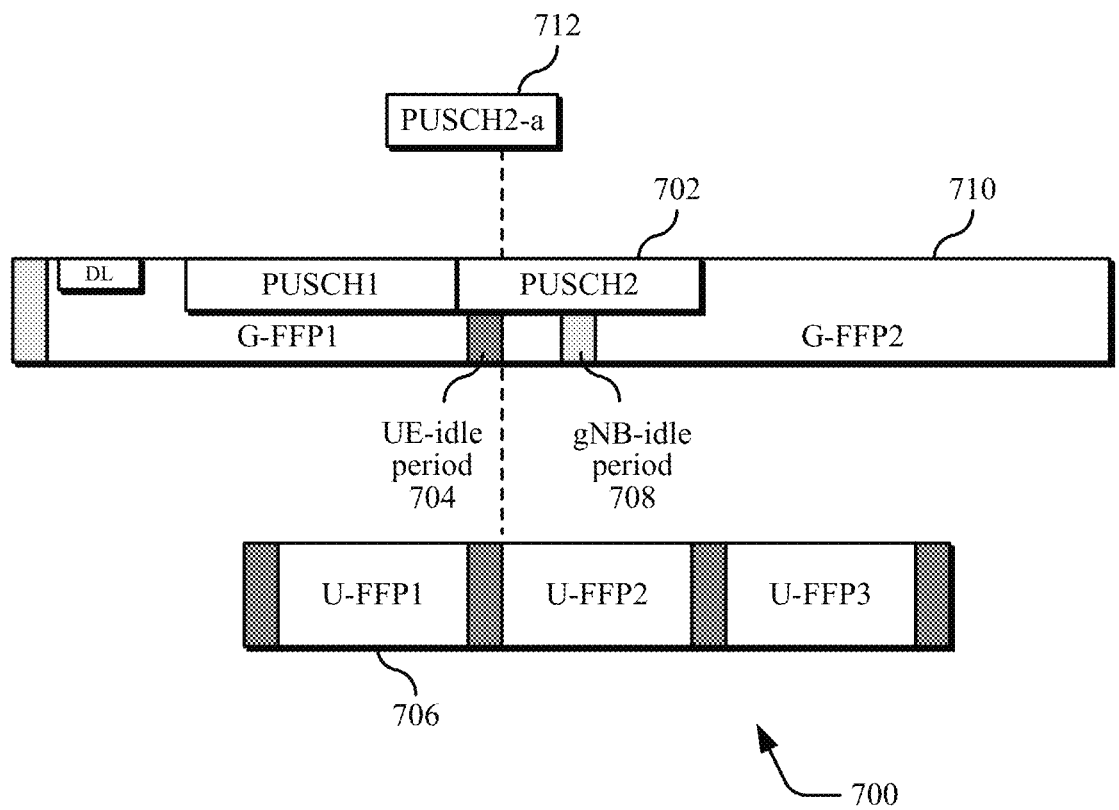
FIG. 7 illustrates an example of PUSCH repetition type B as related to communication operations in a shared spectrum in accordance with aspects of the present disclosure.

FIG. 7 illustrates an example 700 of PUSCH repetition type B, where the second PUSCH repetition 702 (PUSCH2) overlaps both the UE-idle period 704 of a UE-FFP 706 (U-FFP1) and the gNB-idle period 708 of a second gNB-FFP 710 (G-FFP2), and PUSCH2 is segmented to PUSCH2-a 712. The user equipment would not transmit in G-FFP2 710 as it has not validated if the base station has initiated a channel occupancy time in G-FFP2. In this example 700, PUSCH2 702 is transmitted assuming gNB-COT and segmented around the gNB-idle period 708, where for PUSCH2, only the actual repetition before the gNB-idle period is transmitted.

Figure 8:
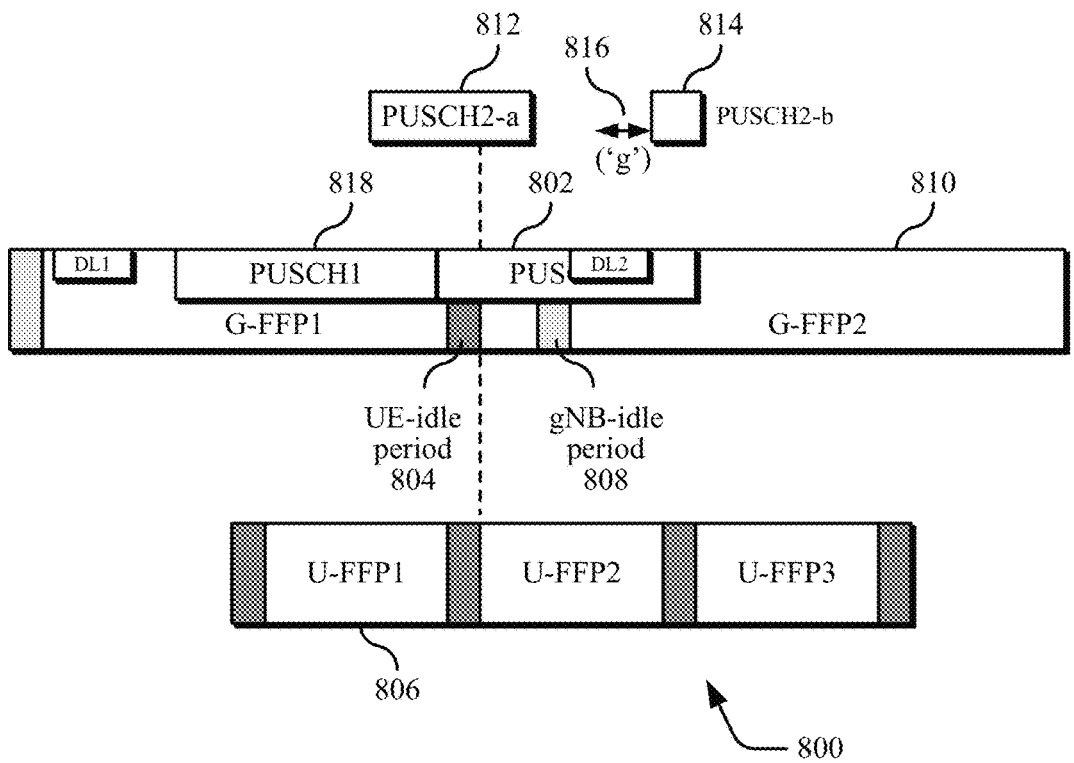
FIG. 8 illustrates an example of PUSCH repetition type B as related to communication operations in a shared spectrum in accordance with aspects of the present disclosure.

FIG. 8 illustrates an example 800 of PUSCH repetition type B, where the second PUSCH repetition 802 (PUSCH2) overlaps both the UE-idle period 804 of a UE-FFP 806 (U-FFP1) and the gNB-idle period 808 of a second gNB-FFP 810 (G-FFP2), and PUSCH2 is segmented to PUSCH2-a 812 and PUSCH2-b 814. The user equipment would not transmit in G-FFP2 810 before validating that the base station has initiated a channel occupancy time in G-FFP2. Additionally, a time gap ('g') 816 which is a longer time duration than the time gap threshold ('T') is taken into account, given that symbols starting at the beginning of the gNB-idle period 808 and ending at the end of time gap ('g') 816 are considered invalid symbols for the purpose of segmentation for PUSCH repetition type B. In this example 800, PUSCH2 802 is transmitted assuming gNB-COT and segmented around the gNB-idle period 808, where for PUSCH2, only the actual repetition before the gNB-idle period, and the actual repetition after the time gap ('g') 816 are transmitted.

In aspects of this disclosure, the channel occupancy time (COT) initiator assumption is determined based on the rules as discussed above in the section "Channel Occupancy Time (COT) Initiator", where the configured uplink transmission is referred to as, and replaced by, a nominal repetition of the configured uplink transmission. In an implementation, the configured uplink transmission is referred to as, and replaced by, an actual repetition of the configured uplink transmission. In another implementation, the user equipment determines a set of invalid symbols associated with each repetition of PUSCH transmission with repetition type B such that each resulting actual repetition is confined in a gNB-FFP or gNB-COT, or in a UE-FFP or UE-COT. In a related implementation, a same channel occupancy time (COT) initiator assumption is applied across all actual repetitions of a nominal PUSCH repetition. In another example, a same channel occupancy time (COT) initiator assumption is applied across all nominal repetitions of a PUSCH repetition bundle. In another example, all actual repetitions of a PUSCH repetition bundle belonging to the same UL transmission burst are associated with the same COT initiator.

In an implementation, the time gap ('g') is defined to be the time gap between the last or first symbol of the downlink transmission burst, and the first symbol of a nominal repetition, and the implementations described above in the section "Determine Transport Block/MAC-PDU" are applicable to each nominal repetition for PUSCH repetition type B. Additionally, for PUSCH repetition type B (as defined in TS 38.214), the user equipment would not perform any transmission of the PUSCH repetitions, including the first transmission of the repetition bundle, if the time gap ('g') is smaller than the time gap threshold ('T'). Alternatively, the user equipment would not perform a first subset of nominal PUSCH repetitions for which the time gap CO is smaller than the time gap threshold ('T').

In the case of a PUSCH transmission scheduled by a dynamic grant, given the scheduling downlink control information indicates the channel occupancy time (COT) initiator assumption (e.g., whether the PUSCH transmission is associated with a gNB-COT or a UE-COT), the user equipment then knows in advance that there is no need to segment around UE-idle period(s) if it is indicated that the channel occupancy time (COT) initiator assumption is gNB-COT or a shared channel occupancy time. In that sense, the problem is similar to the general case discussed above (e.g., no PUSCH repetition), and similar implementations are applicable.

In the case of a PUSCH transmission with a configured grant, if the user equipment has not already initiated a UE COT in a UE-FFP, the user equipment checks as to whether the base station has initiated a gNB-FFP, such as via detection and/or reception of a downlink transmission burst, in which a nominal PUSCH repetition of the uplink transmission starts, and the user equipment then performs the segmentation around the idle period of that gNB-FFP. The problem is similar to the general case discussed above in the section "Determine Transport Block/MAC-PDU" for general uplink transmission. In the case of PUSCH transmission with a configured grant, a nominal repetition of the configured uplink transmission is aligned with a UE FFP boundary and does not end before the idle period of that UE FFP. In an implementation, the user equipment checks as to whether the base station has initiated a gNB FFP, such as via detection and/or reception of a downlink transmission burst, in which the nominal PUSCH repetition of the uplink transmission starts, then user equipment performs the segmentation around the idle period of that gNB-FFP. The problem is similar to the general case discussed above.

Figure 9:
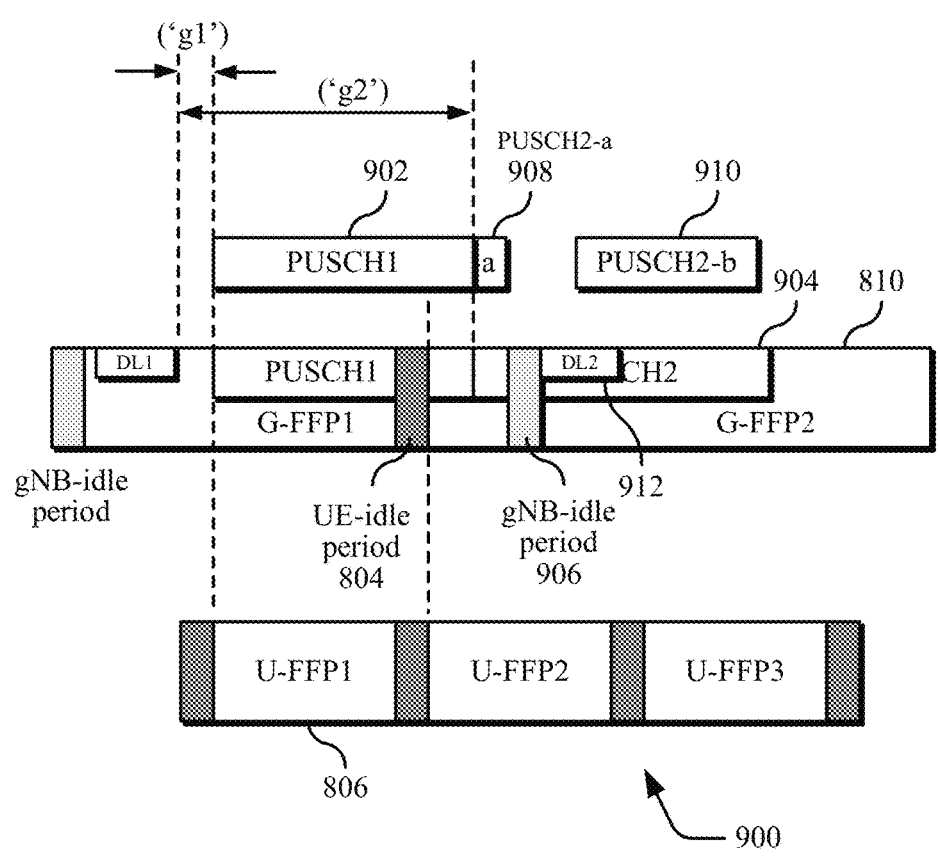
FIG. 9 illustrates an example of a PUSCH1 transmitted according to gNB-COT initiator assumption as related to communication operations in a shared spectrum in accordance with aspects of the present disclosure.

FIG. 9 illustrates an example 900 of a first PUSCH 902 (PUSCH1) that is transmitted according to gNB channel occupancy time (COT) initiator assumption. The user equipment transmits PUSCH1 902 assuming a gNB-COT, such as based on one or more of the implementations described above in the section "Determine Transport Block/MAC-PDU". The user equipment (UE) segments a second PUSCH 904 (PUSCH2) around the gNB-idle period 906. Hence, PUSCH2-a 908 and PUSCH2-b 910, with no transmission in the gNB-idle period 906 and at least during the downlink transmission burst 912 (shown as DL2), with potentially more symbols to respect a timeline as discussed above. In an example, time gap ('g1')<the time gap threshold ('T'), and time gap ('g2')>the time gap threshold ('T').

If the user equipment has already initiated a COT and a nominal PUSCH repetition of the uplink transmission starts within the UE-COT and spans across the UE-FFP boundary, the user equipment performs the segmentation around the idle period of the UE-FFP, and no timeline consideration is needed. In an example, since the user equipment is not expected to determine if the gNB has initiated a channel occupancy time prior to the uplink transmission, the base station is not expected to transmit a downlink transmission burst not later than or earlier than the number of OFDM/SC-FDMA ('G') symbols prior to the uplink transmission.

In an implementation, the user equipment is expected to trigger an autonomous retransmission with a configuration and/or timer that may be different than, or the same as, that of the cg-RetransmissionTimer in the case where the time gap ('g') is of shorter time duration than the time gap threshold ('T') for a configured uplink transmission with PUSCH repetition type B. Further, a set or pattern of invalid symbols are defined per gNB-FFP, and are repeated in each gNB-FFP. In another implementation, a time window or number of symbols at the beginning of gNB-FFP is configured from which the user equipment determines a set of invalid symbols for PUSCH repetition type B transmissions. In a related example, the time window or number of symbols at the beginning of gNB-FFP is determined based on a higher layer parameter and/or configuration, such as PDCCH configuration or based on a DCI, such as the DCI scheduling the PUSCH repetitions.

In an example, the user equipment (UE) indicates to the network, such as via a UE capability signaling and/or reporting, how many gNB-FFPs and/or UE-FFPs can be included in a PUSCH repetition bundle. In an implementation, the UE and/or gNB is not expected to change a higher layer parameter of UE-FFP (such as UE-FFP periodicity or starting offset) within a PUSCH repetition bundle (or within an UL transmission in general) at least when the COT initiator assumption for the PUSCH repetition bundle/UL transmission is UE-COT. In a related implementation, the UE and/or gNB is not expected to change a higher layer parameter of gNB-FFP (such as gNB-FFP periodicity) within a PUSCH repetition bundle (or within an UL transmission in general) at least when the COT initiator assumption for the PUSCH repetition bundle/UL transmission is gNB-COT. In an implementation, the UE determines whether a PUSCH repetition bundle (e.g., repetitions of a PUSCH transmission according to repetition type B) is associated with a channel occupancy that is initiated by (a) the gNB (referred to as assumption (a)) or (b) the UE (referred to as assumption (b)), at least based on one or more of the following: the number of segmentations required corresponding to assumption (a) or assumption (b); or the number of segmentations around idle period(s) of gNB-FFP(s) corresponding to assumption (a) or the number of segmentations around idle period(s) of UE-FFP(s) corresponding to assumption (b).

In some embodiments, joint channel estimation with demodulation reference signal (DMRS) bundling is configured or indicated across multiple PUSCH transmissions and/or repetitions, and a time domain window is defined or configured within which user equipment is expected to maintain phase continuity and power consistency. However, according to one implementation, the time domain window is violated based on the occurrence of either gNB-FFP idle period and/or UE-FFP idle period, i.e., the phase continuity and/or power consistency cannot be maintained due to the occurrence of the idle period. In the example 800 illustrated in FIG. 8, when joint channel estimation is to be applied for PUSCH1 818 and PUSCH2 802, then the gNB-idle period 808 associated with gNB-FFP2 810 (G-FFP2) is considered as a violation event. In this case, joint channel estimation is applied only for PUSCH1 818 and PUSCH2-a 812. For PUSCH2-b 814, the time domain window is restarted and there is no joint channel estimation applied between PUSCH2-a and PUSCH2-b. Note that the principle of violation of a time domain window for joint channel estimation based on an idle period is also applicable to general uplink transmissions, as discussed above.

Figure 10:
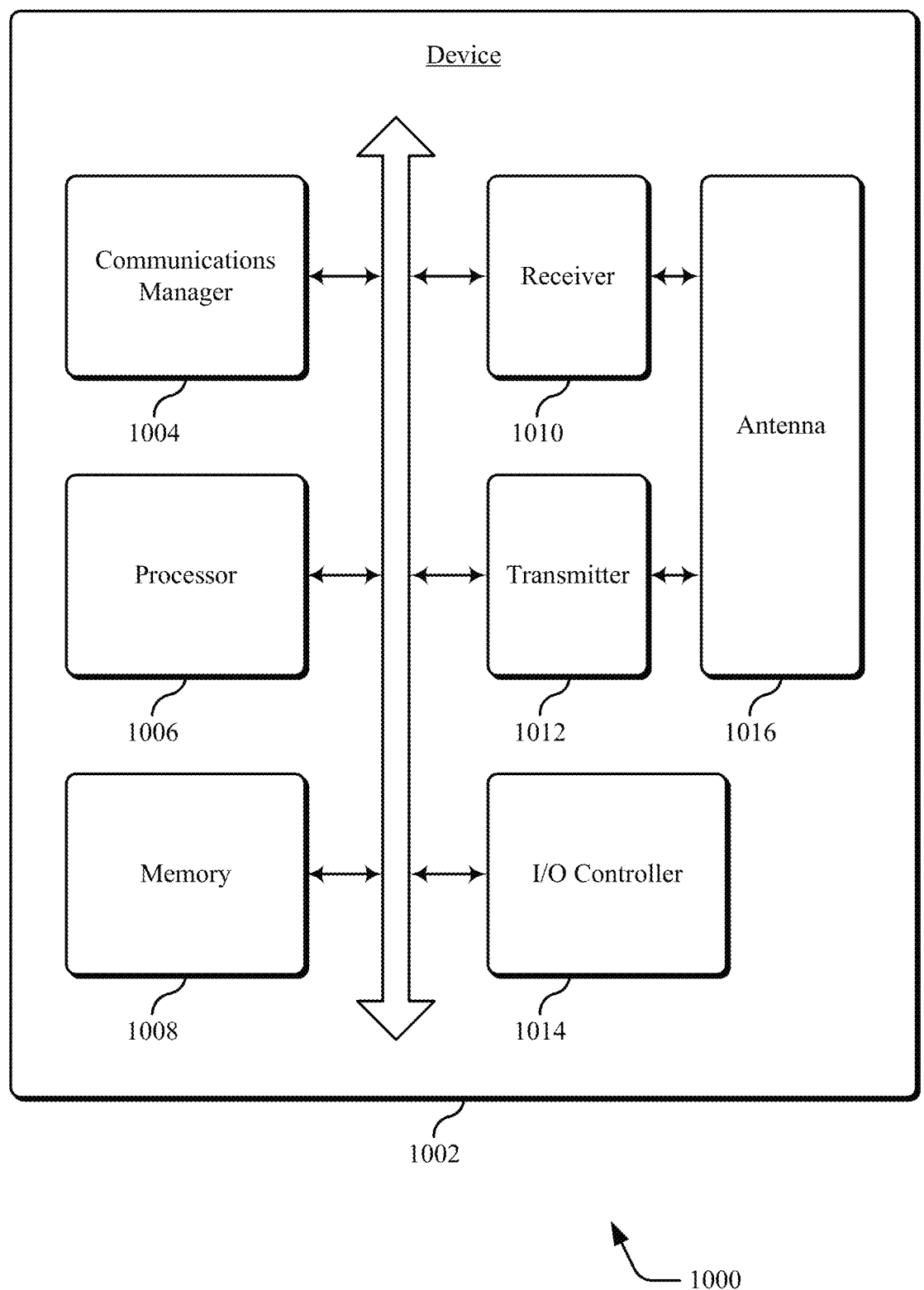
FIG. 10 illustrates an example block diagram of components of a device that supports communication operations in a shared spectrum in accordance with aspects of the present disclosure.

FIG. 10 illustrates an example of a block diagram 1000 of a device 1002 that supports communication operations in a shared spectrum in accordance with aspects of the present disclosure. The device 1002 may be an example of a device, such as a user equipment (UE) 104 as described herein. The device 1002 may support wireless communication with one or more base stations 102, UEs 104, or any combination thereof. The device 1002 may include components for bi-directional communications including components for transmitting and receiving communications, such as a communications manager 1004, a processor 1006, a memory 1008, a receiver 1010, a transmitter 1012, and an I/O controller 1014. These components may be in electronic communication or otherwise coupled (e.g., operatively, communicatively, functionally, electronically, electrically) via one or more interfaces (e.g., buses).

The communications manager 1004, the receiver 1010, the transmitter 1012, or various combinations thereof or various components thereof may be examples of means for performing various aspects of the present disclosure as described herein. For example, the communications manager 1004, the receiver 1010, the transmitter 1012, or various combinations or components thereof may support a method for performing one or more of the functions described herein.

In some implementations, the communications manager 1004, the receiver 1010, the transmitter 1012, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 1006 and the memory 1008 coupled with the processor 1006 may be configured to perform one or more of the functions described herein (e.g., by executing, by the processor 1006, instructions stored in the memory 1008).

Additionally or alternatively, in some implementations, the communications manager 1004, the receiver 1010, the transmitter 1012, or various combinations or components thereof may be implemented in code (e.g., as communications management software or firmware) executed by the processor 1006. If implemented in code executed by the processor 1006, the functions of the communications manager 1004, the receiver 1010, the transmitter 1012, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 1004 may be configured to perform various operations (e.g., receiving, monitoring, transmitting) using or otherwise in cooperation with the receiver 1010, the transmitter 1012, or both. For example, the communications manager 1004 may receive information from the receiver 1010, send information to the transmitter 1012, or be integrated in combination with the receiver 1010, the transmitter 1012, or both to receive information, transmit information, or perform various other operations as described herein. Although the communications manager 1004 is illustrated as a separate component, in some implementations, one or more functions described with reference to the communications manager 1004 may be supported by or performed by the processor 1006, the memory 1008, or any combination thereof. For example, the memory 1008 may store code, which may include instructions executable by the processor 1006 to cause the device 1002 to perform various aspects of the present disclosure as described herein, or the processor 1006 and the memory 1008 may be otherwise configured to perform or support such operations.

For example, the communications manager 1004 may support wireless communication at a first device (e.g., the device 1002) in accordance with examples as disclosed herein. The communications manager 1004 and/or other device components may be configured as or otherwise support a means for wireless communication at a device, including receiving a configured uplink grant from a base station for semi-persistent uplink transmissions via a serving cell; receiving a timer configuration for a retransmission timer associated with the configured uplink grant; receiving a configuration of a next-generation NodeB fixed frame period for semi-static channel access in a shared spectrum; detecting a downlink transmission burst within the next-generation NodeB fixed frame period associated with the configuration; obtaining a medium access control protocol data unit for a configured uplink transmission of the semi-persistent uplink transmissions, the configured uplink transmission including at least a first physical uplink shared channel transmission; and establishing that a hybrid automatic repeat request process associated with the first physical uplink shared channel transmission is pending so as to preclude performance of the first physical uplink shared channel transmission in response to determinations that the first physical uplink shared channel transmission is associated with a next-generation NodeB channel occupancy time, there is a time gap between the downlink transmission burst within the next-generation NodeB channel occupancy time, and the first physical uplink shared channel transmission is smaller than a time gap threshold.

Additionally, wireless communication at a device includes any one or combination of: indicating a listen before talk failure based on the establishing that the hybrid automatic repeat request process associated with the first physical uplink shared channel transmission is pending. The time gap is between a symbol of the downlink transmission burst and a first symbol of the first physical uplink shared channel transmission. The symbol is the last symbol of the downlink transmission burst. The time gap threshold is determined based on a physical uplink shared channel preparation procedure time. The configured uplink transmission includes physical uplink shared channel repetitions according to physical uplink shared channel repetition type B. The device is a user equipment, and a physical uplink shared channel repetition does not overlap with both an idle period of the user equipment fixed frame period and an idle period of the next-generation NodeB fixed frame period. The first physical uplink shared channel transmission is a nominal physical uplink shared channel repetition. The device is user equipment that determines a set of invalid symbols associated with the first physical uplink shared channel transmission, and wherein each resulting actual repetition is confined in a next-generation NodeB fixed frame period or a user equipment fixed frame period. The first physical uplink shared channel transmission is segmented into one or more actual physical uplink shared channel repetitions that occur prior to an idle period of a next-generation NodeB fixed frame period associated with the next-generation NodeB channel occupancy time, and none of the one or more actual physical uplink shared channel repetitions occur after the idle period of the next-generation NodeB fixed frame period. The determination that the first physical uplink shared channel transmission is associated with the next-generation NodeB channel occupancy time includes determining that the first physical uplink shared channel transmission is confined within the next-generation NodeB channel occupancy time. The first physical uplink shared channel transmission is an actual repetition of a nominal physical uplink shared channel repetition. Retransmissions of the hybrid automatic repeat request process are performed based on the configured uplink grant and a modulation and coding scheme, and the device does not toggle a new data indicator in the configured grant uplink control information in the retransmissions. Further selecting a hybrid automatic repeat request process identifier from available hybrid automatic repeat request process identifiers for the configured uplink transmission.

Additionally, a device for wireless communication includes a transceiver to receive a configured uplink grant from a base station for semi-persistent uplink transmissions via a serving cell; receive a timer configuration for a retransmission timer associated with the configured uplink grant; receive a configuration of a next-generation NodeB fixed frame period for semi-static channel access in a shared spectrum; detect a downlink transmission burst within the next-generation NodeB fixed frame period associated with the configuration; and obtain a medium access control protocol data unit for a configured uplink transmission of the semi-persistent uplink transmissions, the configured uplink transmission including at least a first physical uplink shared channel transmission. The device also includes a communications manager to establish that a hybrid automatic repeat request process associated with the first physical uplink shared channel transmission is pending so as to preclude performance of the first physical uplink shared channel transmission in response to determinations that the first physical uplink shared channel transmission is associated with a next-generation NodeB channel occupancy time, there is a time gap between the downlink transmission burst within the next-generation NodeB channel occupancy time, and the first physical uplink shared channel transmission is smaller than a time gap threshold. The time gap is between a symbol of the downlink transmission burst and a first symbol of the first physical uplink shared channel transmission, and the time gap threshold is determined based on a physical uplink shared channel preparation procedure time.

The processor 1006 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 1006 may be configured to operate a memory array using a memory controller. In some other implementations, a memory controller may be integrated into the processor 1006. The processor 1006 may be configured to execute computer-readable instructions stored in a memory (e.g., the memory 1008) to cause the device 1002 to perform various functions of the present disclosure.

The memory 1008 may include random access memory (RAM) and read-only memory (ROM). The memory 1008 may store computer-readable, computer-executable code including instructions that, when executed by the processor 1006 cause the device 1002 to perform various functions described herein. The code may be stored in a non-transitory computer-readable medium such as system memory or another type of memory. In some implementations, the code may not be directly executable by the processor 1006 but may cause a computer (e.g., when compiled and executed) to perform functions described herein. In some implementations, the memory 1008 may include, among other things, a basic I/O system (BIOS) which may control basic hardware or software operation such as the interaction with peripheral components or devices.

The I/O controller 1014 may manage input and output signals for the device 1002. The I/O controller 1014 may also manage peripherals not integrated into the device 1002. In some implementations, the I/O controller 1014 may represent a physical connection or port to an external peripheral. In some implementations, the I/O controller 1014 may utilize an operating system such as iOS®, ANDROID®, MS-DOS®, MS-WINDOWS®, OS/2®, UNIX®, LINUX®, or another known operating system. In some implementations, the I/O controller 1014 may be implemented as part of a processor, such as the processor 1006. In some implementations, a user may interact with the device 1002 via the I/O controller 1014 or via hardware components controlled by the I/O controller 1014.

In some implementations, the device 1002 may include a single antenna 1016. However, in some other implementations, the device 1002 may have more than one antenna 1016, which may be capable of concurrently transmitting or receiving multiple wireless transmissions. The receiver 1010 and the transmitter 1012 may communicate bi-directionally, via the one or more antennas 1016, wired, or wireless links as described herein. For example, the receiver 1010 and the transmitter 1012 may represent a wireless transceiver and may communicate bi-directionally with another wireless transceiver. The transceiver may also include a modem to modulate the packets, to provide the modulated packets to one or more antennas 1016 for transmission, and to demodulate packets received from the one or more antennas 1016.

Figure 11:
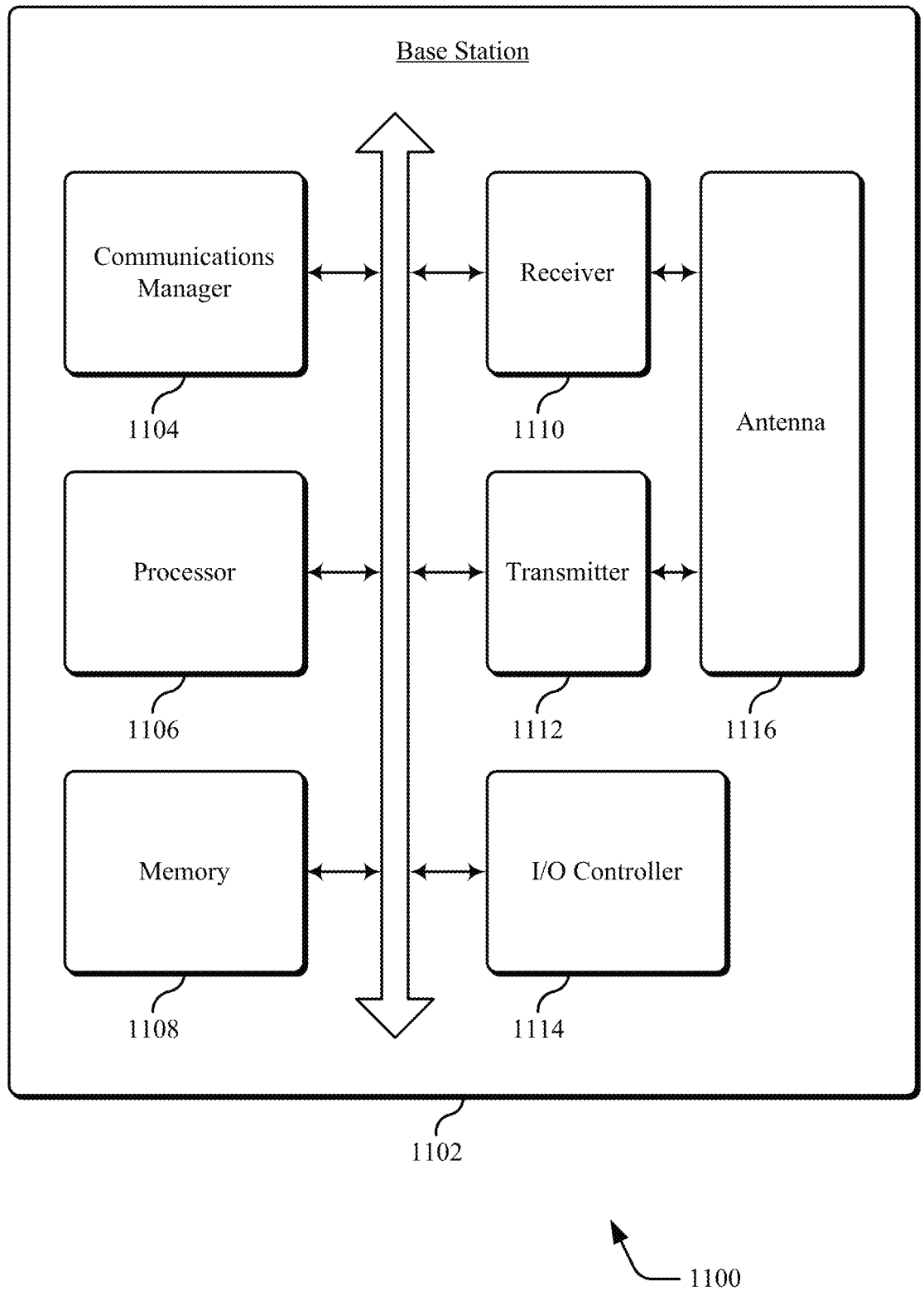
FIG. 11 illustrates an example block diagram of components of a base station that supports communication operations in a shared spectrum in accordance with aspects of the present disclosure.

FIG. 11 illustrates an example of a block diagram 1100 of a device 1102 that supports communication operations in a shared spectrum in accordance with aspects of the present disclosure. The device 1102 may be an example of a base station 102, such as a next-generation NodeB (gNB) as described herein. The device 1102 may support wireless communication with one or more base stations 102, UEs 104, or any combination thereof. The device 1102 may include components for bi-directional communications including components for transmitting and receiving communications, such as a communications manager 1104, a processor 1106, a memory 1108, a receiver 1110, a transmitter 1112, and an I/O controller 1114. These components may be in electronic communication or otherwise coupled (e.g., operatively, communicatively, functionally, electronically, electrically) via one or more interfaces (e.g., buses).

The communications manager 1104, the receiver 1110, the transmitter 1112, or various combinations thereof or various components thereof may be examples of means for performing various aspects of the present disclosure as described herein. For example, the communications manager 1104, the receiver 1110, the transmitter 1112, or various combinations or components thereof may support a method for performing one or more of the functions described herein.

In some implementations, the communications manager 1104, the receiver 1110, the transmitter 1112, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 1106 and the memory 1108 coupled with the processor 1106 may be configured to perform one or more of the functions described herein (e.g., by executing, by the processor 1106, instructions stored in the memory 1108).

Additionally or alternatively, in some implementations, the communications manager 1104, the receiver 1110, the transmitter 1112, or various combinations or components thereof may be implemented in code (e.g., as communications management software or firmware) executed by the processor 1106. If implemented in code executed by the processor 1106, the functions of the communications manager 1104, the receiver 1110, the transmitter 1112, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 1104 may be configured to perform various operations (e.g., receiving, monitoring, transmitting) using or otherwise in cooperation with the receiver 1110, the transmitter 1112, or both. For example, the communications manager 1104 may receive information from the receiver 1110, send information to the transmitter 1112, or be integrated in combination with the receiver 1110, the transmitter 1112, or both to receive information, transmit information, or perform various other operations as described herein. Although the communications manager 1104 is illustrated as a separate component, in some implementations, one or more functions described with reference to the communications manager 1104 may be supported by or performed by the processor 1106, the memory 1108, or any combination thereof. For example, the memory 1108 may store code, which may include instructions executable by the processor 1106 to cause the device 1102 to perform various aspects of the present disclosure as described herein, or the processor 1106 and the memory 1108 may be otherwise configured to perform or support such operations.

For example, the communications manager 1104 may support wireless communication at a first device (e.g., the device 1102) in accordance with examples as disclosed herein. The communications manager 1104 and/or other device components may be configured as or otherwise support a means for wireless communication at a base station, including transmitting a configured uplink grant to a device for semi-persistent uplink transmissions via a serving cell; transmitting a timer configuration for a retransmission timer associated with the configured uplink grant to the device; and transmitting a downlink transmission burst within a next-generation NodeB fixed frame period associated with a configuration of the next-generation NodeB fixed frame period, the downlink transmission burst being transmitted not later than a time gap threshold prior to a configured uplink transmission when the device is expected to determine if the base station has initiated a channel occupancy time prior to the configured uplink transmission.

Additionally, wireless communication at a base station includes any one or combination of: the downlink transmission burst includes downlink control information. The device triggers autonomous retransmission of a medium access control protocol data unit on a next available configured grant resource which satisfies a criteria for the autonomous retransmission. The criteria for the autonomous retransmission includes the retransmission timer is not running for a hybrid automatic repeat request process associated with the next available configured grant resource.

The processor 1106 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 1106 may be configured to operate a memory array using a memory controller. In some other implementations, a memory controller may be integrated into the processor 1106. The processor 1106 may be configured to execute computer-readable instructions stored in a memory (e.g., the memory 1108) to cause the device 1102 to perform various functions of the present disclosure.

The memory 1108 may include random access memory (RAM) and read-only memory (ROM). The memory 1108 may store computer-readable, computer-executable code including instructions that, when executed by the processor 1106 cause the device 1102 to perform various functions described herein. The code may be stored in a non-transitory computer-readable medium such as system memory or another type of memory. In some implementations, the code may not be directly executable by the processor 1106 but may cause a computer (e.g., when compiled and executed) to perform functions described herein. In some implementations, the memory 1108 may include, among other things, a basic I/O system (BIOS) which may control basic hardware or software operation such as the interaction with peripheral components or devices.

The I/O controller 1114 may manage input and output signals for the device 1102. The I/O controller 1114 may also manage peripherals not integrated into the device 1102. In some implementations, the I/O controller 1114 may represent a physical connection or port to an external peripheral. In some implementations, the I/O controller 1114 may utilize an operating system such as iOS®, ANDROID®, MS-DOS®, MS-WINDOWS®, OS/2®, UNIX®, LINUX®, or another known operating system. In some implementations, the I/O controller 1114 may be implemented as part of a processor, such as the processor 1106. In some implementations, a user may interact with the device 1102 via the I/O controller 1114 or via hardware components controlled by the I/O controller 1114.

In some implementations, the device 1102 may include a single antenna 1116. However, in some other implementations, the device 1102 may have more than one antenna 1116, which may be capable of concurrently transmitting or receiving multiple wireless transmissions. The receiver 1110 and the transmitter 1112 may communicate bi-directionally, via the one or more antennas 1116, wired, or wireless links as described herein. For example, the receiver 1110 and the transmitter 1112 may represent a wireless transceiver and may communicate bi-directionally with another wireless transceiver. The transceiver may also include a modem to modulate the packets, to provide the modulated packets to one or more antennas 1116 for transmission, and to demodulate packets received from the one or more antennas 1116.

Figure 12:
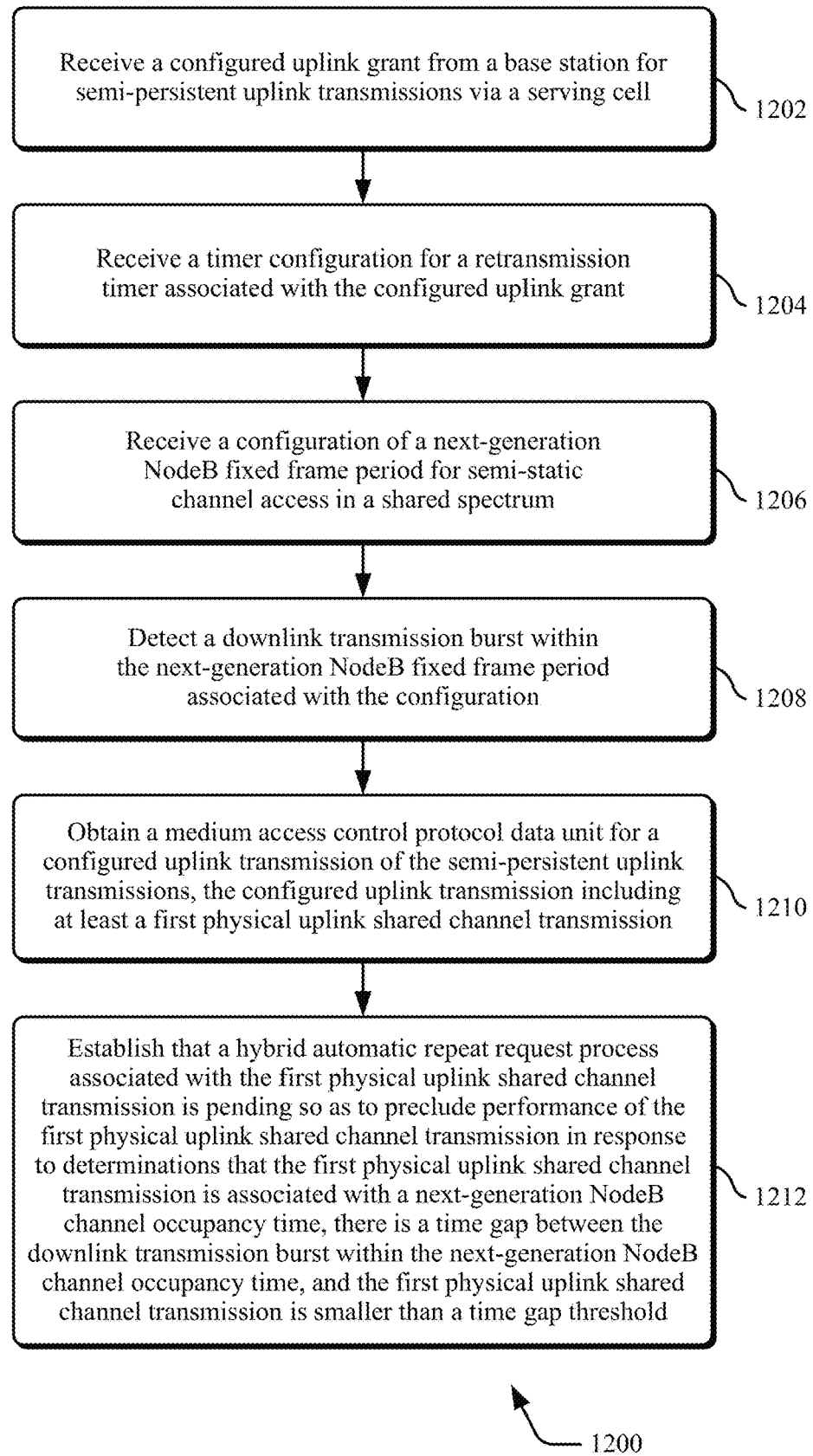
FIGS. 12 and 13 illustrate flowcharts of methods that support communication operations in a shared spectrum in accordance with aspects of the present disclosure.

FIG. 12 illustrates a flowchart of a method 1200 that supports communication operations in a shared spectrum in accordance with aspects of the present disclosure. The operations of the method 1200 may be implemented by a device or its components as described herein. For example, the operations of the method 1200 may be performed by a device, such as user equipment (UE) 114 as described with reference to FIGS. 1 through 11. In some implementations, the device may execute a set of instructions to control the function elements of the device to perform the described functions. Additionally, or alternatively, the device may perform aspects of the described functions using special-purpose hardware.

At 1202, the method may include receiving a configured uplink grant from a base station for semi-persistent uplink transmissions via a serving cell. The operations of 1202 may be performed in accordance with examples as described herein. In some implementations, aspects of the operations of 1202 may be performed by a device as described with reference to FIG. 1.

At 1204, the method may include receiving a timer configuration for a retransmission timer associated with the configured uplink grant. The operations of 1204 may be performed in accordance with examples as described herein. In some implementations, aspects of the operations of 1204 may be performed by a device as described with reference to FIG. 1.

At 1206, the method may include receiving a configuration of a next-generation NodeB fixed frame period for semi-static channel access in a shared spectrum. The operations of 1206 may be performed in accordance with examples as described herein. In some implementations, aspects of the operations of 1206 may be performed by a device as described with reference to FIG. 1.

At 1208, the method may include detecting a downlink transmission burst within the next-generation NodeB fixed frame period associated with the configuration. The operations of 1208 may be performed in accordance with examples as described herein. In some implementations, aspects of the operations of 1208 may be performed by a device as described with reference to FIG. 1.

At 1210, the method may include obtaining a medium access control protocol data unit for a configured uplink transmission of the semi-persistent uplink transmissions, the configured uplink transmission including at least a first physical uplink shared channel transmission. The operations of 1210 may be performed in accordance with examples as described herein. In some implementations, aspects of the operations of 1210 may be performed by a device as described with reference to FIG. 1.

At 1212, the method may include establishing that a hybrid automatic repeat request process associated with the first physical uplink shared channel transmission is pending so as to preclude performance of the first physical uplink shared channel transmission in response to determinations that the first physical uplink shared channel transmission is associated with a next-generation NodeB channel occupancy time, there is a time gap between the downlink transmission burst within the next-generation NodeB channel occupancy time, and the first physical uplink shared channel transmission is smaller than a time gap threshold. The operations of 1212 may be performed in accordance with examples as described herein. In some implementations, aspects of the operations of 1212 may be performed by a device as described with reference to FIG. 1.

Figure 13:
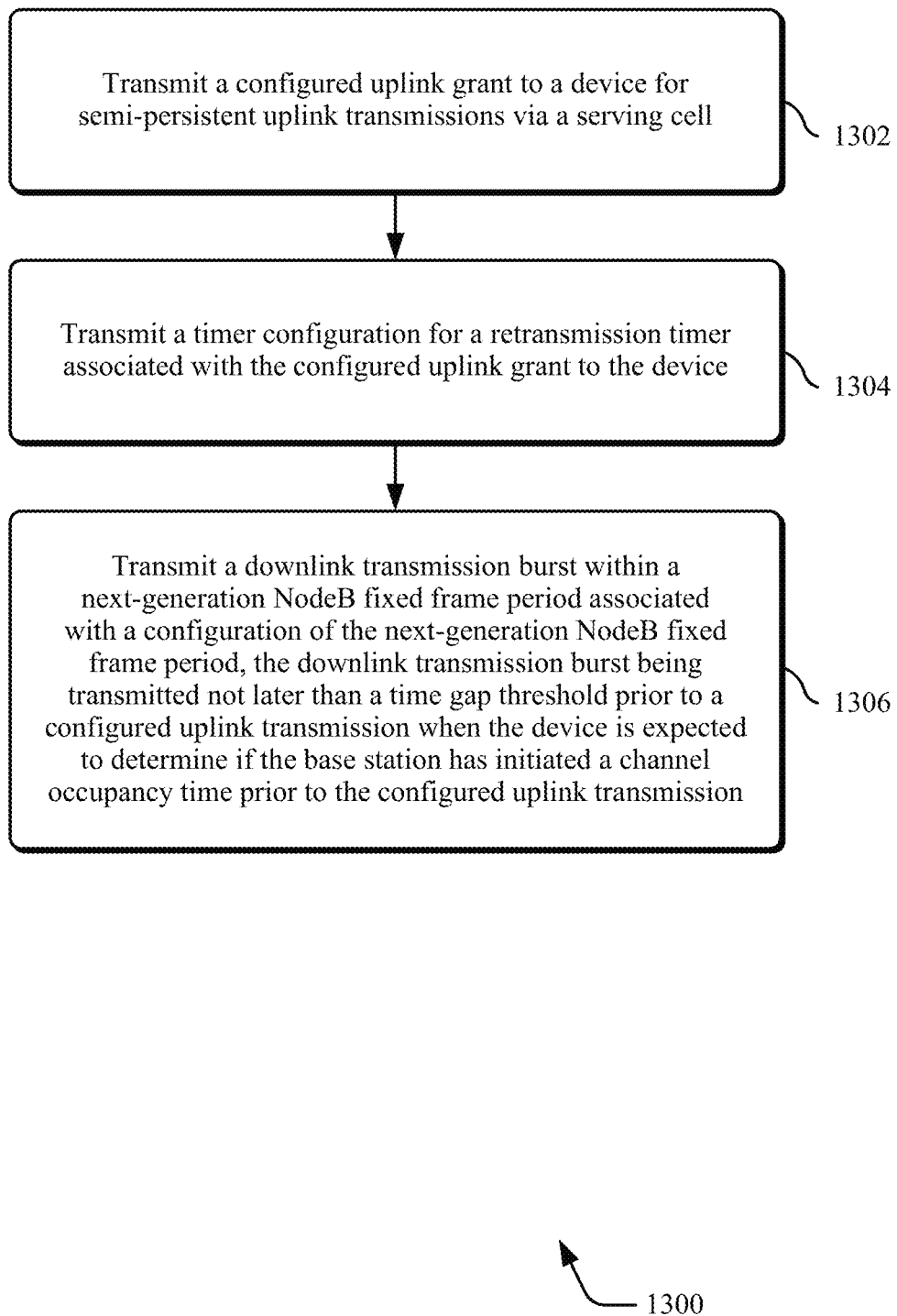

FIG. 13 illustrates a flowchart of a method 1300 that supports communication operations in a shared spectrum in accordance with aspects of the present disclosure. The operations of the method 1300 may be implemented by a device or its components as described herein. For example, the operations of the method 1300 may be performed by a base station 102, such as a next-generation NodeB (gNB) as described with reference to FIGS. 1 through 11. In some implementations, the device may execute a set of instructions to control the function elements of the device to perform the described functions. Additionally, or alternatively, the device may perform aspects of the described functions using special-purpose hardware.

At 1302, the method may include transmitting a configured uplink grant to a device for semi-persistent uplink transmissions via a serving cell. The operations of 1302 may be performed in accordance with examples as described herein. In some implementations, aspects of the operations of 1302 may be performed by a device as described with reference to FIG. 1.

At 1304, the method may include transmitting a timer configuration for a retransmission timer associated with the configured uplink grant to the device. The operations of 1304 may be performed in accordance with examples as described herein. In some implementations, aspects of the operations of 1304 may be performed by a device as described with reference to FIG. 1.

At 1306, the method may include transmitting a downlink transmission burst within a next-generation NodeB fixed frame period associated with a configuration of the next-generation NodeB fixed frame period, the downlink transmission burst being transmitted not later than a time gap threshold prior to a configured uplink transmission when the device is expected to determine if the base station has initiated a channel occupancy time prior to the configured uplink transmission. The operations of 1306 may be performed in accordance with examples as described herein. In some implementations, aspects of the operations of 1306 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations can be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method performed by a user equipment (UE), the method comprising:
   receiving a configured uplink grant that indicates a plurality of uplink resources associated with at least one uplink transmission;
   receiving a configuration of a base station fixed frame period for semi-static channel access in a shared spectrum;
   detecting a downlink transmission burst within the base station fixed frame period, wherein the base station fixed frame period comprises at least one uplink resource of the plurality of uplink resources; and
   transmitting the at least one uplink transmission within the base station fixed frame period based on a duration between the downlink transmission burst and the at least one uplink transmission satisfying a threshold value.

2. The method of claim 1, wherein transmitting the at least one uplink transmission comprises:
   determining that a hybrid automatic repeat request process associated with the at least one uplink transmission is pending;
   refraining from transmitting the at least one uplink transmission based on the base station fixed frame period comprising the at least one uplink resource; and
   transmitting signaling that indicates a listen before talk failure.

3. The method of claim 1, wherein the duration is between a symbol of the downlink transmission burst and a first symbol of the at least one uplink transmission.

4. The method of claim 3, wherein the symbol of the downlink transmission burst is a last symbol of the downlink transmission burst.

5. The method of claim 1, wherein the threshold value is based on a physical uplink shared channel preparation procedure time.

6. The method of claim 1, wherein the configured uplink grant schedules one or more physical uplink shared channel repetitions according to physical uplink shared channel repetition type B.

7. The method of claim 6, wherein the one or more physical uplink shared channel repetitions do not overlap with both an idle period of a UE fixed frame period and an idle period of the base station fixed frame period.

8. The method of claim 1, wherein the at least one uplink transmission is a nominal physical uplink shared channel repetition.

9. The method of claim 8, further comprising determining a set of invalid symbols associated with the at least one uplink transmission, wherein each resulting actual repetition is confined in the base station fixed frame period or a UE fixed frame period.

10. The method of claim 8, wherein the at least one uplink transmission is segmented into one or more actual physical uplink shared channel repetitions that occur prior to an idle period of the base station fixed frame period, and wherein none of the one or more actual physical uplink shared channel repetitions occur after the idle period of the base station fixed frame period.

11. The method of claim 1, further comprising determining that the at least one uplink transmission is confined within a base station channel occupancy time associated with the base station fixed frame period.

12. The method of claim 11, wherein the at least one uplink transmission is an actual repetition of a nominal physical uplink shared channel repetition.

13. The method of claim 2, wherein retransmissions of the hybrid automatic repeat request process are performed based on the configured uplink grant and a modulation and coding scheme, and wherein the UE does not toggle a new data indicator in configured grant uplink control information in the retransmissions.

14. The method of claim 1, further comprising selecting a hybrid automatic repeat request process identifier from available hybrid automatic repeat request process identifiers for the at least one uplink transmission.

15. A method performed by a base station, the method comprising:
   transmitting a configured uplink grant that indicates a plurality of uplink resources associated with at least one uplink transmission;
   transmitting a configuration of a base station fixed frame period for semi-static channel access in a shared spectrum;
   transmitting a downlink transmission burst within the base station fixed frame period, wherein the base station fixed frame period comprises at least one uplink resource of the plurality of uplink resources; and
   receiving the at least one uplink transmission within the base station fixed frame period based on a duration between the downlink transmission burst and the at least one uplink transmission satisfying a threshold value, wherein the duration is between a symbol of the downlink transmission burst and a first symbol of the at least one uplink transmission.

16. The method of claim 15, wherein the downlink transmission burst includes downlink control information.

17. The method of claim 15, wherein a medium access control protocol data unit is retransmitted on a next available uplink resource of the plurality of uplink resources, and wherein the next available uplink resource satisfies a criteria for autonomous retransmission.

18. A user equipment (UE) for wireless communication, comprising:
   at least one memory; and
   at least one processor coupled with the at least one memory and configured to cause the UE to:
      receive a configured uplink grant that indicates a plurality of uplink resources associated with at least one uplink transmission;
      receive a configuration of a base station fixed frame period for semi-static channel access in a shared spectrum;
      detect a downlink transmission burst within the base station fixed frame period, wherein the base station fixed frame period comprises at least one uplink resource of the plurality of uplink resources; and
      transmit the at least one uplink transmission within the base station fixed frame period based on a duration between the downlink transmission burst and the at least one uplink transmission satisfying a threshold value.

19. The UE of claim 18, wherein the duration is between a symbol of the downlink transmission burst and a first symbol of the at least one uplink transmission, and wherein the threshold value is based on a physical uplink shared channel preparation procedure time.

20. A processor for wireless communication, comprising:
   at least one controller coupled with at least one memory and configured to cause the processor to:
      receive a configured uplink grant that indicates a plurality of uplink resources associated with at least one uplink transmission;
      receive a configuration of a base station fixed frame period for semi-static channel access in a shared spectrum;
      detect a downlink transmission burst within the base station fixed frame period, wherein the base station fixed frame period comprises at least one uplink resource of the plurality of uplink resources; and
      transmit the at least one uplink transmission within the base station fixed frame period based on a duration between the downlink transmission burst and the at least one uplink transmission satisfying a threshold value.

* * * * *